United States Patent [19]
Surace et al.

[11] Patent Number: 6,144,938
[45] Date of Patent: Nov. 7, 2000

[54] VOICE USER INTERFACE WITH PERSONALITY

[75] Inventors: Kevin J. Surace, Sunnyvale; George M. White, Santa Cruz; Byron B. Reeves; Clifford I. Nass, both of Stanford; Mark D. Campbell; Roy D. Albert, both of San Jose; James P. Giangola, Oakland, all of Calif.

[73] Assignee: Sun Microsystems, Inc., Sunnyvale, Calif.

[21] Appl. No.: 09/071,717

[22] Filed: May 1, 1998

[51] Int. Cl.[7] .................................................. G10L 15/22
[52] U.S. Cl. ........................................... 704/257; 704/270
[58] Field of Search ................................... 704/270, 260, 704/258, 200, 201, 257, 255, 275

[56] References Cited

U.S. PATENT DOCUMENTS

| | | | |
|---|---|---|---|
| 5,367,454 | 11/1994 | Kawamoto et al. | 395/326 |
| 5,500,920 | 3/1996 | Kupiec | 395/2.79 |
| 5,559,927 | 9/1996 | Clynes | 395/2.67 |
| 5,636,325 | 6/1997 | Farrett | 704/258 |
| 5,860,064 | 1/1999 | Henton | 704/260 |
| 5,873,057 | 2/1999 | Eves et al. | 704/201 |
| 5,987,415 | 11/1999 | Breese et al. | 704/270 |

FOREIGN PATENT DOCUMENTS

| | | | |
|---|---|---|---|
| 0 697780A | 2/1996 | European Pat. Off. | H04M 3/50 |
| WO 96/11542 | 4/1996 | WIPO | H04M 1/00 |
| WO 97/33416 | 9/1997 | WIPO | H04M 1/00 |

OTHER PUBLICATIONS

Chin, John P., "Personality Trait Attributions to Voice Mail User Interfaces", Proceedings of the 1996 Conference on Human Factors in Computing Systems, CHI 96, Online! Apr. 13–18, 1996, pp. 248–249, XP002113878 Vancouver, BC, CA; retrieved from the Internet on 1999-09-96.

"Method for Appropriately Interfacing to User Characteristics in a Voice Interface System," IBM Technical Disclosure Bulletin, vol. 37, No. 3, pp. 307–308, XP000441484, New York, Mar. 1994.

Database Inspec 'Online' Institute of Electrical Engineers, Stevenage, GB, Trainer et al.: "The inclusion of personality trait based adaptive interfaces into computer based learning and training environments," Database accession No. 5193879 XP992113879, Abstract and Proceedings of the Thirty–First International Matador Conference, Apr. 20–21, 1995, pp. 195–200, Manchester, UK ISBN: 0–333–64086–1.

*Primary Examiner*—Richemond Dorvil
*Attorney, Agent, or Firm*—Skjerven Morrill MacPherson LLP

[57] ABSTRACT

The present invention provides a voice user interface with personality. In one embodiment, a method includes executing a voice user interface, and controlling the voice user interface to provide the voice user interface with a personality. The method includes selecting a prompt based on various context situations, such as a previously selected prompt and the user's experience with using the voice user interface.

102 Claims, 18 Drawing Sheets

Example: `Modify an appointment on June 13 at 3 p.m. (modify, appointment).

| MODIFY APPOINTMENT Belongs to family of commands which we reference as : | <COMMAND> <OBJECT> <OPTION1> <OPTION2> <COMMAND> = modify, <OBJECT> = appointment, <OPTION1> = date <OPTION2> = time |

Processing starts at the upper right and proceeds left to right and top to bottom

FIG. 12

FIG. 14 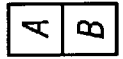

| LABEL | User says | Flow Control | Computer says |
|---|---|---|---|
| | | If <OPTION1> is filled or <OPTION2> is filled, goto T_NEEDAPPOIN TMENT | |
| | | Get LAST APPOINTMENT CHANGED | TTS: The last appointment was <say appointment>. Is that the appointment you want to change? |
| S_RIGHT APPOINT MENTa | `yes` | set <OPTION1> to date and <OPTION2> to time, goto T_WHATTOMODIFY | |
| a | or `no` | say A:; null out <OPTION1> and <OPTION2>:; goto T_NEEDAPPOIN TMENT | |

*FIG. 14A*

| | | | |
|---|---|---|---|
| a | or `help` | goto T_HELP | |
| a | or TIMEOUT | say A:; goto S_RIGHTAPPOINTMENT | A: Hurry up and say something. |
| a | or BAD_SCORE | If failure_count <4, say A and goto S_RIGHTAPPOINTMENT or else say B and goto MainDialog | A: I couldn't understand that.<br><br>B: I give up. Going back to main menu. |
| T_NEED APPOINT MENT | | If <OPTION1> is filled, goto T_STARTTIME | PROMPT FOR INPUT, e.g. "What's the date of the appointment you'd like to modify?"<br>"Okay. Tell me the date and I can pull that information up for you"<br>"Okay. Give me the date and we'll take a look."<br>"Okay. Give me the date and I'll check your calendar." |
| S_DATE b | [date] | Goto S_STARTTIME | |
| b | or `help` | goto HELP | |

FIG. 14B

| Mail Domain | |
|---|---|
| mail_top_navlist | What do you want me to do with your mail?<br>Ready. What can I do for you?<br>Okay, mail's ready. How can I help you?<br>I'm looking at you messages on my monitor. What would you like me to do?<br>Okay, ready. Tell me what you'd like me to do.<br>What can I do for you? |
| mail_sum_all_voicemail_none | You have no voicemail.<br>You don't have anything right now.<br>I don't have any voicemail for you right now.<br>There aren't any voicemail messages.<br>There aren't any messages for you at the moment.<br>I'm afraid there isn't any voicemail.<br>I'm afraid there's no voicemail at all, old or new.<br>You've checked so recently, there are no voicemail messages waiting.<br>Sorry, the computer tells me there aren't any voicemail messages for us.<br>Bad computer, no biscuit. And no voicemail messages either.<br>The voicemail message queue is empty right now. |
| gu_mail_reply_recipient | I'm having trouble, too. Let's leave this alone for now.<br>You know what? There's a problem that has me stumped for the moment. I'm afraid we have to go back to the top.<br>This has gone from embarrassing to mortifying.<br>I'm really sorry. Could we please start over again?<br>We appear to be stuck right now. Hope you don't mind if we take it from the top.<br><Chuckle> This isn't going well, is it? Let's start over. |

*FIG. 15*

VOICE USER INTERFACE WITH PERSONALITY

CROSS-REFERENCE TO MICROFICHE APPENDICES

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to user interfaces and, more particularly, to a voice user interface with personality.

BACKGROUND

Personal computers (PCs), sometimes referred to as micro-computers, have gained widespread use in recent years, primarily, because they are inexpensive and yet powerful enough to handle computationally-intensive applications. PCs typically include graphical user interfaces (GUIs). Users interact with and control an application executing on a PC using a GUI. For example, the Microsoft WINDOWS™ Operating System (OS) represents an operating system that provides a GUI. A user controls an application executing on a PC running the Microsoft WINDOWS™ OS using a mouse to select menu commands and click on and move icons.

The increasingly powerful applications for computers have led to a growing use of computers for various computer telephony applications. For example, voice mail systems are typically implemented using software executing on a computer that is connected to a telephone line for storing voice data signals transmitted over the telephone line. A user of a voice mail system typically controls the voice mail system using dual tone multiple frequency (DTMF) commands and, in particular, using a telephone keypad to select the DTMF commands available. For example, a user of a voice mail system typically dials a designated voice mail telephone number, and the user then uses keys of the user's telephone keypad to select various commands of the voice mail system's command hierarchy. Telephony applications can also include a voice user interface that recognizes speech signals and outputs speech signals.

SUMMARY

The present invention provides a voice user interface with personality. For example, the present invention provides a cost-effective and high performance computer-implemented voice user interface with personality that can be used for various applications in which a voice user interface is desired such as telephony applications.

In one embodiment, a method includes executing a voice user interface, and controlling the voice user interface to provide the voice user interface with a personality. A prompt is selected among various prompts based on various criteria. For example, the prompt selection is based on a prompt history. Accordingly, this embodiment provides a computer system that executes a voice user interface with personality.

In one embodiment, controlling the voice user interface includes selecting a smooth hand-off prompt to provide a smooth hand-off between a first voice and a second voice of the voice user interface, selecting polite prompts such that the voice user interface behaves consistently with social and emotional norms, including politeness, while interacting with a user of the computer system, selecting brief negative prompts in situations in which negative comments are required, and selecting a lengthened prompt or shortened prompt based on a user's experience with the voice user interface.

In one embodiment, controlling the voice user interface includes providing the voice user interface with multiple personalities. The voice user interface with personality installs a prompt suite for a particular personality from a prompt repository that stores multiple prompt suites, in which the multiple prompt suites are for different personalities of the voice user interface with personality.

Other aspects and advantages of the present invention will become apparent from the following detailed description and accompanying drawings.

BRIEF DESCRIPTION OF THE DRAWINGS

FIG. 12 provides a command specification of a modify appointment command for the system of FIG. 9 in accordance with one embodiment of the present invention.

FIG. 14 shows a subset of the dialog for the modify appointment command of the voice user interface with personality of FIG. 10 in accordance with one embodiment of the present invention.

FIG. 15 provides scripts written for a mail domain of the system of FIG. 9 in accordance with one embodiment of the present invention.

DETAILED DESCRIPTION

The present invention provides a voice user interface with personality. The term "personality" as used in the context of a voice user interface can be defined as the totality of spoken language characteristics that simulate the collective character, behavioral, temperamental, emotional, and mental traits of human beings in a way that would be recognized by psychologists and social scientists as consistent and relevant to a particular personality type. For example, personality types include the following: friendly-dominant, friendly-submissive, unfriendly-dominant, and unfriendly-submissive. Accordingly, a computer system that interacts with a user (e.g., over a telephone) and in which it is desirable to offer a voice user interface with personality would particularly benefit from the present invention.

A Voice User Interface With Personality

Figure 1:
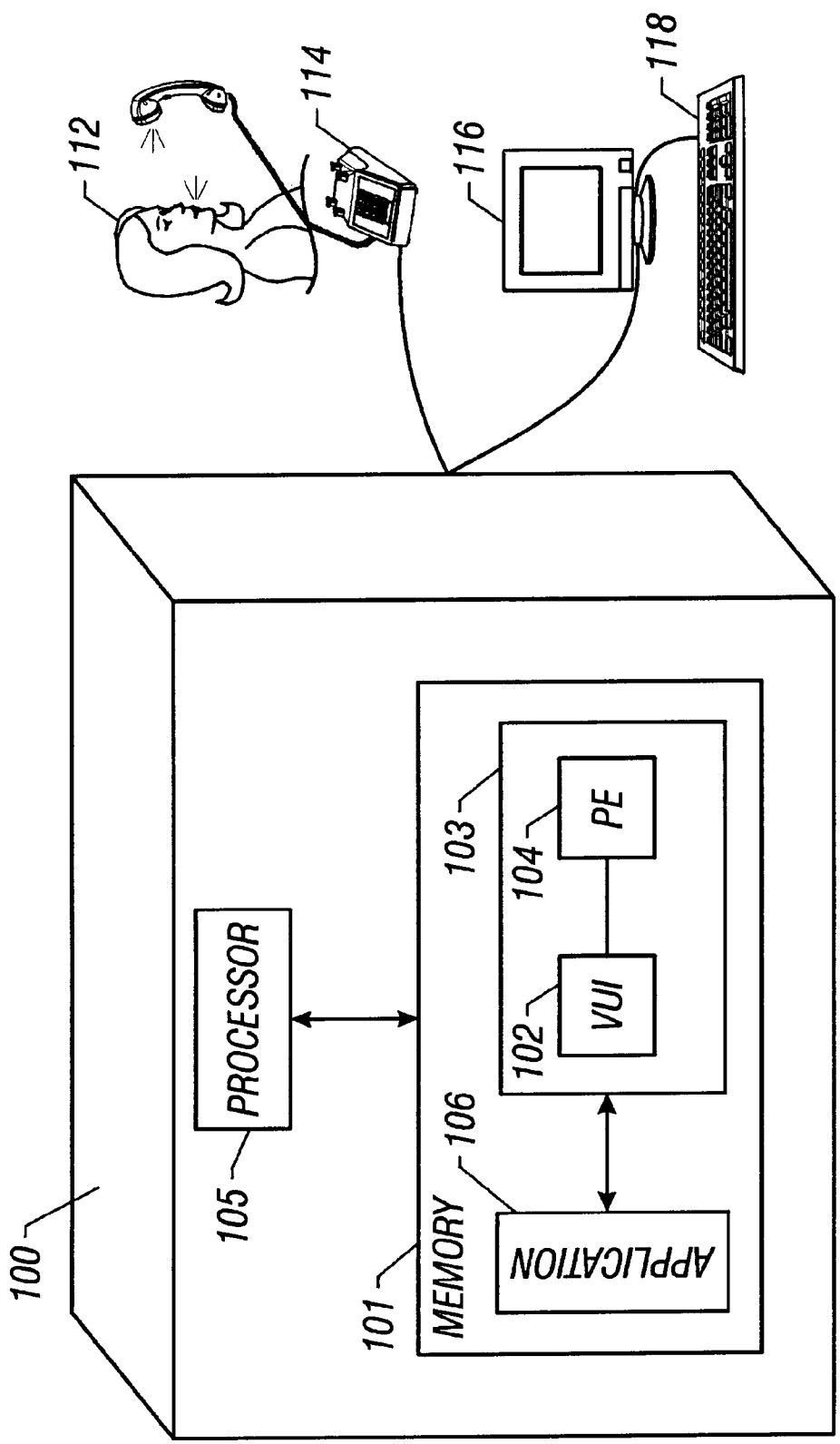
FIG. 1 is a block diagram of a voice user interface with personality in accordance with one embodiment of the present invention.

FIG. 1 is a block diagram of a voice user interface with personality in accordance with one embodiment of the present invention. FIG. 1 includes a computer system 100. Computer system 100 includes a memory 101 (e.g., volatile and non-volatile memory) and a processor 105 (e.g., an Intel PENTIUM™ microprocessor), and computer system 100 is connected to a standard display 116 and a standard keyboard 118. These elements are those typically found in most general purpose computers, and in fact, computer system 100 is intended to be representative of a broad category of data processing devices. Computer system 100 can also be in communication with a network (e.g., connected to a LAN). It will be appreciated by one of ordinary skill in the art that computer system 100 can be part of a larger system.

Memory 101 stores a voice user interface with personality 103 that interfaces with an application 106. Voice user interface with personality 103 includes voice user interface software 102 and a personality engine 104. Voice user interface software 102 is executed on processor 105 to allow user 112 to verbally interact with application 106 executing on computer system 100 via a microphone and speaker 114. Computer system 100 can also be controlled using a standard graphical user interface (GUI) (e.g., a Web browser) via keyboard 118 and monitor 116.

Voice user interface with personality 103 uses a dialog to interact with user 112. Voice user interface with personality 103 interacts with user 112 in a manner that gives user 112 the impression that voice user interface with personality 103 has a personality. The personality of voice user interface with personality 103 is generated using personality engine 104, which controls the dialog output by voice user interface software 102 during interactions with user 112. For example, personality engine 104 can implement any application-specific, cultural, politeness, psychological, or social rules and norms that emulate or model human verbal behavior (e.g., providing varied verbal responses) such that user 112 receives an impression of a voice user interface with a personality when interacting with computer system 100. Accordingly, voice user interface with personality 103 executed on computer system 100 provides a computer-implemented voice user interface with personality.

Figure 2:
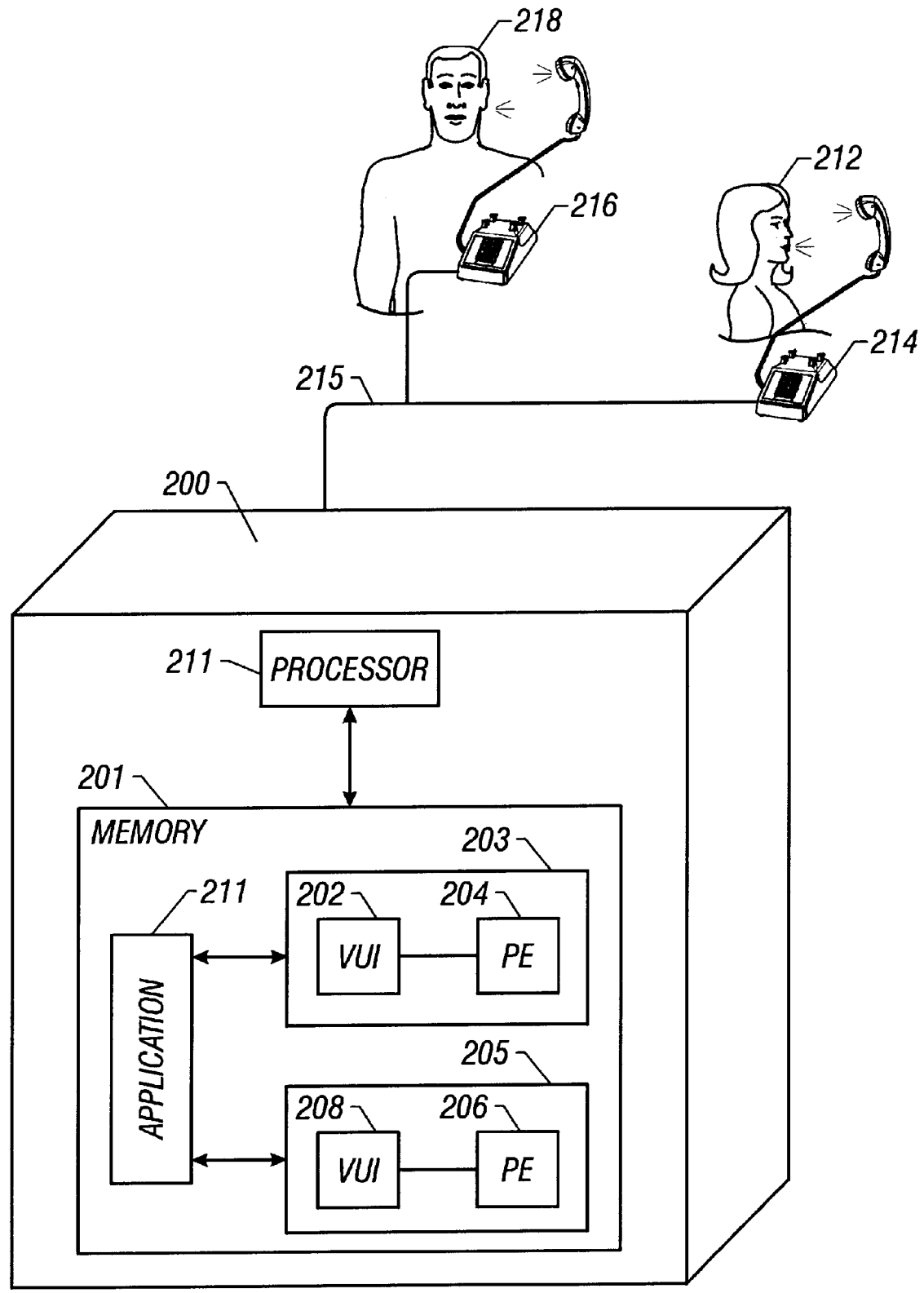
FIG. 2 is a block diagram of a voice user interface with personality that includes multiple personalities in accordance with one embodiment of the present invention.

FIG. 2 is a block diagram of a voice user interface with personality that includes multiple personalities in accordance with one embodiment of the present invention. FIG. 2 includes a computer system 200, which includes a memory 201 (e.g., volatile and non-volatile memory) and a processor 211 (e.g., an Intel PENTIUM™ microprocessor). Computer system 200 can be a standard computer or any data processing device. It will be appreciated by one of ordinary skill in the art that computer system 200 can be part of a larger system.

Memory 201 stores a voice user interface with personality 203, which interfaces with an application 211 (e.g., a telephony application that provides a voice mail service). Voice user interface with personality 203 includes voice user interface software 202. Voice user interface with personality 203 also includes a personality engine 204. Personality engine 204 controls voice user interface software 202 to provide a voice user interface with a personality. For example, personality engine 204 provides a friendly-dominant personality that interacts with a user using a dialog of friendly directive statements (e.g., statements that are spoken typically as commands with few or no pauses).

Memory 201 also stores a voice user interface with personality 205, which interfaces with application 211. Voice user interface with personality 205 includes voice user interface software 208. Voice user interface with personality 205 also includes a personality engine 206. Personality engine 206 controls voice user interface software 208 to provide a voice user interface with a personality. For example, personality engine 206 provides a friendly-submissive personality that interacts with a user using a dialog of friendly but submissive statements (e.g., statements that are spoken typically as questions and with additional explanation or pause).

User 212 interacts with voice user interface with personality 203 executing on computer system 200 using a telephone 214 that is in communication with computer system 200 via a network 215 (e.g., a telephone line). User 218 interacts with voice user interface with personality 205 executing on computer system 200 using a telephone 216 that is in communication with computer system 200 via network 215.

Figure 3:
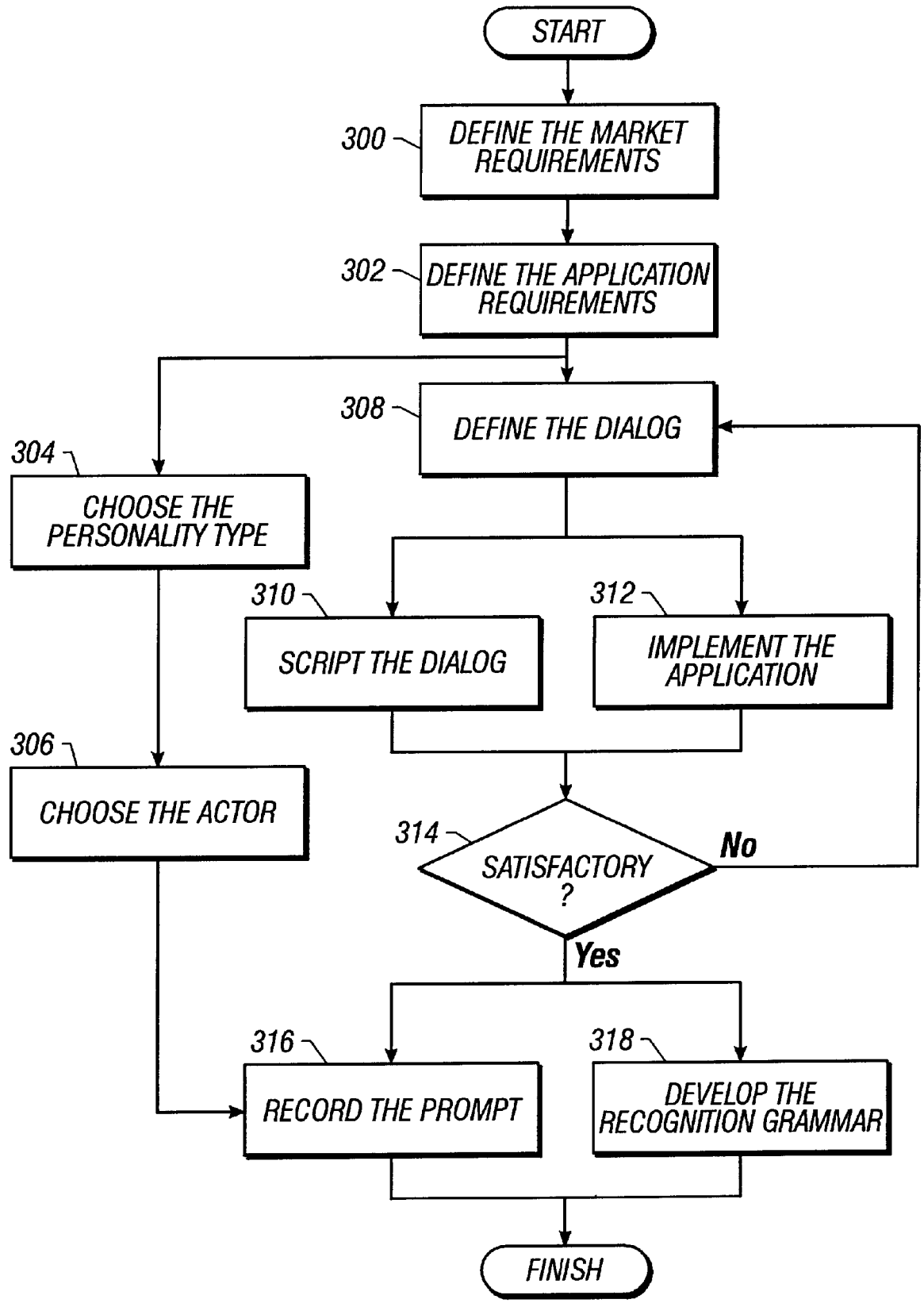
FIG. 3 is a flow diagram illustrating a process for implementing a computer-implemented voice user interface with personality in accordance with one embodiment of the present invention.

An Overview of an Implementation of a Computer-Implemented Voice User Interface With Personality FIG. 3 is a flow diagram illustrating a process for implementing a computer-implemented voice user interface with personality in accordance with one embodiment of the present invention.

At stage 300, market requirements are determined. The market requirements represent the desired application functionality of target customers or subscribers for a product or service, which includes a voice user interface with personality.

At stage 302, application requirements are defined. Application requirements include functional requirements of a computer-implemented system that will interact with users using a voice user interface with personality. For example, application requirements include various functionality such as voice mail and electronic mail (email). The precise use of the voice user interface with personality within the system is also determined.

At stage 304, a personality is selected. The personality can be implemented as personality engine 104 to provide a voice user interface 102 with personality. For example, a voice user interface with personality uses varied responses to interact with a user.

In particular, those skilled in the art of, for example, social psychology review the application requirements, and they then determine which personality types best serve the delivery of a voice user interface for the functions or services included in the application requirements. A personality or multiple personalities are selected, and a complete description is created of a stereotypical person displaying the selected personality or personalities, such as age, gender, education, employment history, and current employment position. Scenarios are developed for verbal interaction between the stereotypical person and typical users.

At stage 306, an actor is selected to provide the voice of the selected personality. The selection of an actor for a particular personality is further discussed below.

At stage 308, a dialog is generated based on the personality selected at stage 304. The dialog represents the dialog that the voice user interface with personality uses to interact with a user at various levels within a hierarchy of commands of the system. For example, the dialog can include various greetings that are output to a user when the user logs onto the system. In particular, based on the selected personality, the dialogs are generated that determine what the computer-implemented voice user interface with personality can output (e.g., say) to a user to start various interactions, and what the computer-implemented voice user interface with personality can output to respond to various types of questions or responses in various situations during interactions with the user.

At stage 310, scripts are written for the dialog based on the selected personality. For example, scripts for a voice user interface with personality that uses varied responses can be written to include varied greetings, which can be randomly selected when a user logs onto the system to be output by the voice user interface with personality to the user. During stage 310, script writers, such as professional script writers who would typically be writing for television programs or movies, are given the dialogs generated during stage 308 and instructed to re-write the dialogs using language that consistently represents the selected personality.

At stage 312, the application is implemented. The application is implemented based on the application requirements and the dialog. For example, a finite state machine can be generated, which can then be used as a basis for a computer programmer to efficiently and cost-effectively code the voice user interface with personality. In particular, a finite state machine is generated such that all functions specified in the application requirements of the system can be accessed by a user interacting with the computer-implemented voice user interface with personality. The finite state machine is then coded in a computer language that can be compiled or interpreted and then executed on a computer such as computer system 100. For example, the finite state machine can be coded in "C" code and compiled using various C compilers for various computer platforms (e.g., the Microsoft WINDOWS™ OS executing on an Intel X86™/ PENTIUM™ microprocessor). The computer programs are executed by a data processing device such as computer system 100 and thereby provide an executable voice user interface with personality. For example, commercially available tools provided by ASR vendors such as Nuance Corporation of Menlo Park, Calif., can be used to guide software development at stage 318.

Stage 314 determines whether the scripted dialog can be practically and efficiently implemented for the voice user interface with personality of the application. For example, if the scripted dialog cannot be practically and efficiently implemented for the voice user interface with personality of the application (e.g., by failing to collect from a user of the application a parameter that is required by the application), then the dialog is refined at stage 308.

At stage 316, the scripts (e.g., prompts) are recorded using the selected actor. The scripts are read by the actor as directed by a director in a manner that provides recorded scripts of the actor's voice reflecting personality consistent with the selected personality. For example, a system that includes a voice user interface with personality, which provides a voice user interface with a friendly-dominant personality would have the speaker speak more softly and exhibit greater pitch range than if the voice user interface had a friendly-submissive personality.

At stage 318, a recognition grammar is generated. The recognition grammar specifies a set of commands that a voice user interface with personality can understand when spoken by a user. For example, a computer-implemented system that provides voice mail functionality can include a recognition grammar that allows a user to access voice mail by saying "get my voice mail", "do I have any voice mail", and "please get me my voice mail". Also, if the voice user interface with personality includes multiple personalities, then each of the personalities of the voice user interface with personality may include a unique recognition grammar.

In particular, commercially available speech recognition systems with recognition grammars are provided by ASR (Automatic Speech Recognition) technology vendors such as the following: Nuance Corporation of Menlo Park, Calif.; Dragon Systems of Newton, Mass.; IBM of Austin, Tex.; Kurzweil Applied Intelligence of Waltham, Mass.; Lernout Hauspie Speech Products of Burlington, Mass.; and PureSpeech, Inc. of Cambridge, Mass. Recognition grammars are written specifying what sentences and phrases are to be recognized by the voice user interface with personality (e.g., in different states of the finite state machine). For example, a recognition grammar can be generated by a computer scientist or a computational linguist or a linguist. The accuracy of the speech recognized ultimately depends on the selected recognition grammars. For example, recognition grammars that permit too many alternatives can result in slow and inaccurate ASR performance. On the other hand, recognition grammars that are too restrictive can result in a failure to encompass a users' input. In other words, users would either need to memorize what they could say or be faced with a likely failure of the ASR system to recognize what they say as the recognition grammar did not anticipate the sequence of words actually spoken by the user. Thus, crafting of recognition grammars can often be helped by changing the prompts of the dialog. A period of feedback is generally helpful in tabulating speech recognition errors such that recognition grammars can be modified and scripts modified as well as help generated in order to coach a user to say phrases or commands that are within the recognition grammar.

A Computer-Implemented Voice User Interface With Personality

Figure 4:
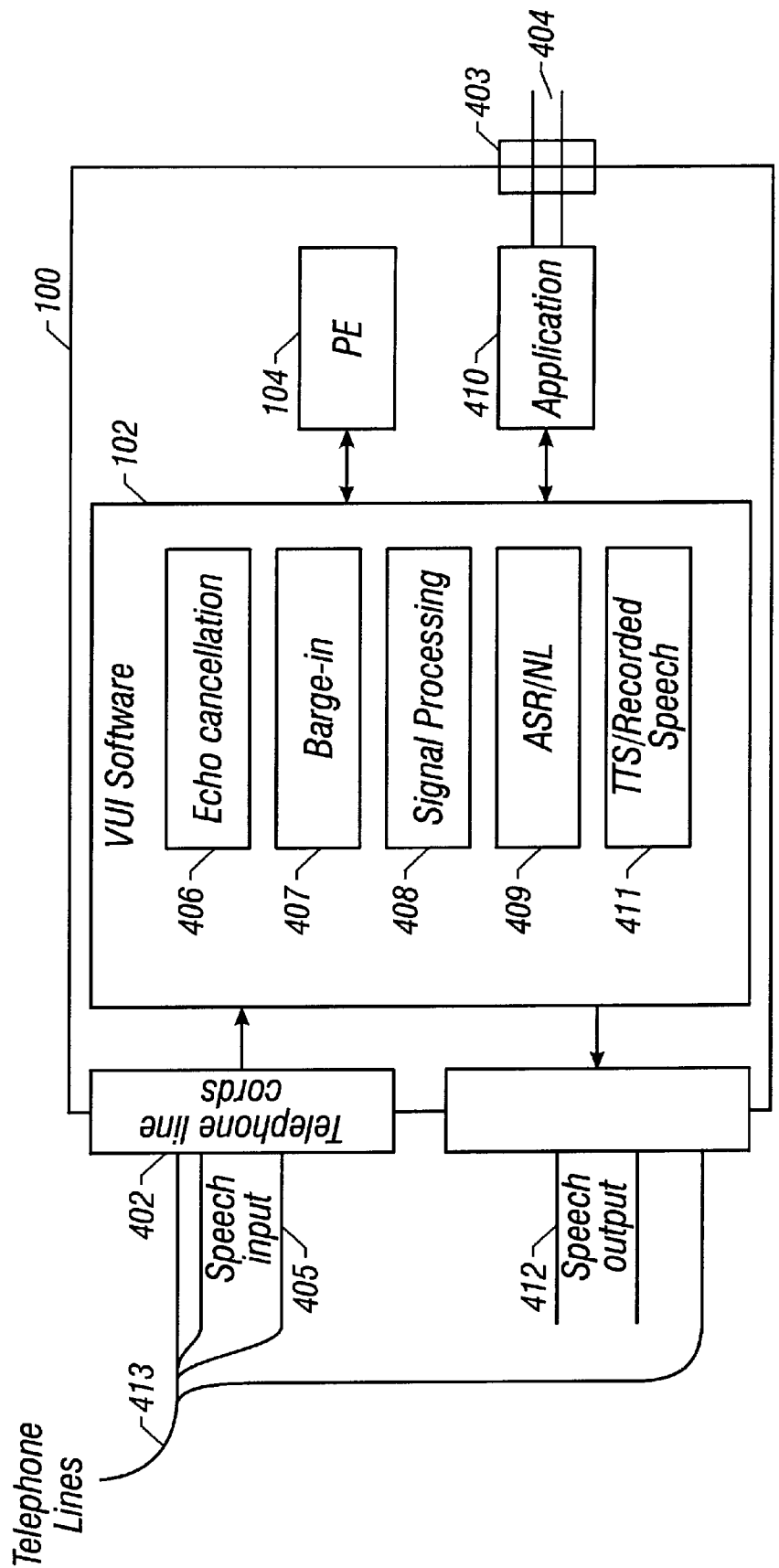
FIG. 4 is a block diagram of the computer-implemented voice user interface with personality of FIG. 1 shown in greater detail in accordance with one embodiment of the present invention.

FIG. 4 is a block diagram of the computer-implemented voice user interface with personality of FIG. 1 shown in greater detail in accordance with one embodiment of the present invention. FIG. 4 includes computer system 100 that executes voice user interface software 102 that is controlled by personality engine 104. Voice user interface software 102 interfaces with an application 410 (e.g., a telephony application). Computer system 100 can be a general purpose computer such as a personal computer (PC). For example, computer system 100 can be a PC that includes an Intel PENTIUM™ running the Microsoft WINDOWS 95™ operating system (OS) or the Microsoft WINDOWS NT™ OS.

Computer system 100 includes telephone line cards 402 that allow computer system 100 to communicate with telephone lines 413. Telephone lines 413 can be analog telephone lines, digital T1 lines, digital T3 lines, or OC3 telephony feeds. For example, telephone line cards 402 can be commercially available telephone line cards with 24 lines from Dialogic Corporation of Parsippany, N.J., or commercially available telephone line cards with 2 to 48 lines from Natural MicroSystems Inc. of Natick, Mass. Computer system 100 also includes a LAN (Local Area Network) connector 403 that allows computer system 100 to communicate with a network such as a LAN or Internet 404, which uses the well-known TCP/IP (Transmission Control Protocol/Internet Protocol). For example, LAN card 403 can be a commercially available LAN card from 3COM Corporation of Santa Clara, Calif. The voice user interface with personality may need to access various remote databases and, thus, can reach the remote databases via LAN or Internet 404. Accordingly, the network, LAN or Internet 404, is integrated into the system, and databases residing on remote servers can be accessed by voice user interface software 102 and personality engine 104.

Users interact with voice user interface software 102 over telephone lines 413 through telephone line cards 402 via speech input data 405 and speech output data 412. For example, speech input data 405 can be coded as 32-kilobit ADPCM (Adaptive Differential Pulse Coded Modulation) or 64-KB MU-law parameters using commercially available modulation devices from Rockwell International of Newport Beach, Calif.

Voice user interface software 102 includes echo cancellation software 406. Echo cancellation software 406 removes echoes caused by delays in the telephone system or reflections from acoustic waves in the immediate environment of the telephone user such as in an automobile. Echo cancellation software 406 is commercially available from Noise Cancellation Technologies of Stamford, Conn.

Voice user interface software 102 also includes barge-in software 407. Barge-in software detects speech from a user in contrast to ambient background noise. When speech is detected, any speech output from computer system 100 such as via speech output data 412 is shut off at its source in the software so that the software can attend to the new speech input. The effect observed by a user (e.g., a telephone caller) is the ability of the user to interrupt computer system 100 generated speech simply by talking. Barge-in software 407 is commercially available from line card manufacturers and ASR technology suppliers such as Dialogic Corporation of Parsippany, N.J., and Natural MicroSystems Inc. of Natick, Mass. Barge-in increases an individual's sense that they are interacting with a voice user interface with personality.

Voice user interface software 102 also includes signal processing software 408. Speech recognizers typically do not operate directly on time domain data such as ADPCM. Accordingly, signal processing software 408 performs signal processing operations, which result in transforming speech into a series of frequency domain parameters such as standard cepstral coefficients. For example, every 10 milliseconds, a twelve-dimensional vector of cepstral coefficients is produced to model speech input data 405. Signal processing software 408 is commercially available from line card manufacturers and ASR technology suppliers such as Dialogic Corporation of Parsippany, N.J., and Natural MicroSystems Inc. of Natick, Mass.

Voice user interface software 102 also includes ASR/NL software 409. ASR/NL software 409 performs automatic speech recognition (ASR) and natural language (NL) speech processing. For example, ASR/NL software is commercially available from the following companies: Nuance Corporation of Menlo Park, Calif., as a turn-key solution; Applied Language Technologies, Inc. of Boston, Mass.; Dragon Systems of Newton, Mass.; and PureSpeech, Inc. of Cambridge, Mass. The natural language processing component can be obtained separately as commercially available software products from UNISYS Corporation of Blue Bell, Pa. The commercially available software typically is modified for particular applications such as a computer telephony application. For example, the voice user interface with personality can be modified to include a customized grammar, as further discussed below.

Voice user interface software 102 also includes TTS/recorded speech output software 411. Text-to-speech(TTS)/recorded speech output software 411 provides functionality that enables computer system 100 to talk (e.g., output speech via speech output data 412) to a user of computer system 100. For example, if the information to be communicated to the user or the caller originates as text such as an email document, then TTS software 411 speaks the text to the user via speech output data 412 over telephone lines 413. For example, TTS software is commercially available from the following companies: AcuVoice, Inc. of San Jose, Calif.; Centigram Communications Corporation of San Jose, Calif.; Digital Equipment Corporation (DEC) of Maynard, Mass.; Lucent Technologies of Murray Hill, N.J.; and Entropic Research Laboratory, Inc. of Menlo Park, Calif. TTS/recorded speech software 411 also allows computer system 100 to output recorded speech (e.g., recorded prompts) to the user via speech output data 412 over telephone lines 413. For example, several thousand recorded prompts can be stored in memory 101 of computer system 100 (e.g., as part of personality engine 104) and played back at any appropriate time, as further discussed below. Accordingly, the variety and personality provided by the recorded prompts and the context sensitivity of the selection and output of the recorded prompts by personality engine 104 provides a voice user interface with personality implemented in computer system 100.

Application 410 is in communication with a LAN or the Internet 404. For example, application 410 is a telephony application that provides access to email, voice mail, fax, calendar, address book, phone book, stock quotes, news, and telephone switching equipment. Application 410 transmits a request for services that can be served by remote computers using the well-known TCP/IP protocol over LAN or the Internet 404.

Accordingly, voice user interface software 102 and personality engine 104 execute on computer system 100 (e.g., execute on a microprocessor such as an Intel PENTIUM™ microprocessor) to provide a voice user interface with personality that interacts with a user via telephone lines 413.

Personality Engine

Figure 5:
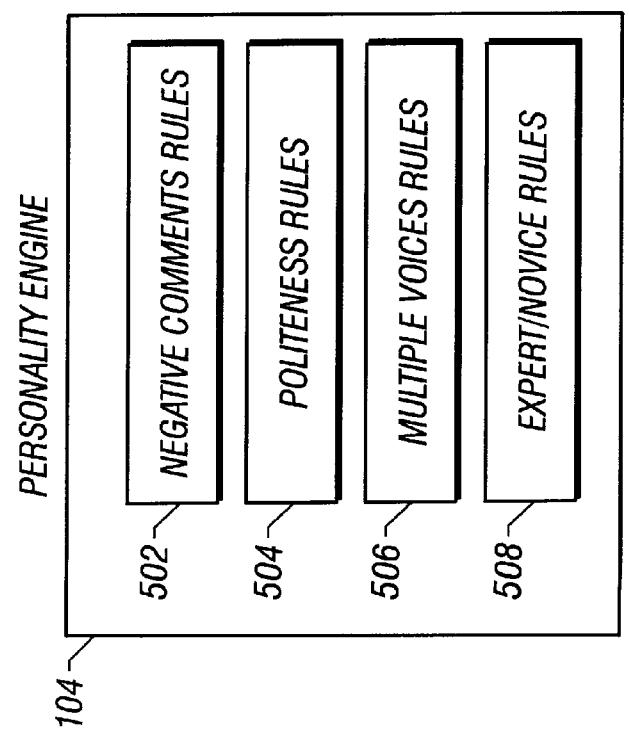
FIG. 5 is a block diagram of the personality engine of FIG. 1 shown in greater detail in accordance with one embodiment of the present invention.

FIG. 5 is a block diagram of the personality engine of FIG. 1 shown in greater detail in accordance with one embodiment of the present invention. Personality engine 104 is a rules-based engine for controlling voice user interface software 102.

Personality engine 104 implements negative comments rules 502, which are further discussed below with respect to FIG. 6. Personality engine 104 also implements politeness rules 504, which are further discussed below with respect to FIG. 7. Personality engine 104 implements multiple voices rules 506, which are further discussed below with respect to FIG. 8. Personality engine 104 also implements expert/novice rules 508, which include rules for controlling the voice user interface in situations in which the user learns over time what the system can do and thus needs less helpful prompting. For example, expert/novice rules 508 control the voice user interface such that the voice user interface outputs recorded prompts of an appropriate length (e.g., detail) depending on a particular user's expertise based on the user's current session and based on the user's experience across sessions (e.g., personality engine 104 maintains state information for each user of computer system 100). Accordingly, personality engine 104 executes various rules that direct the behavior of voice user interface software 102 while interacting with users of the system in order to create an impression upon the user that voice user interface with personality 103 has a personality.

Figure 6:
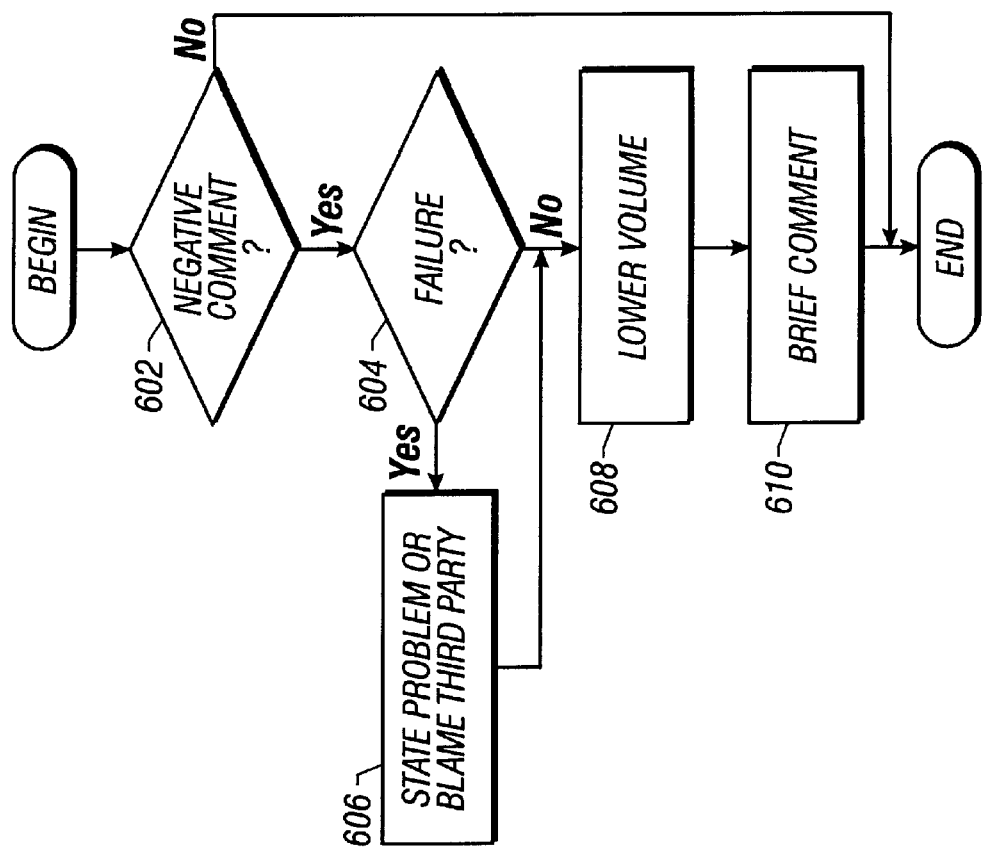
FIG. 6 is a flow diagram of the operation of the negative comments rules of the personality engine of FIG. 5 in accordance with one embodiment of the present invention.

FIG. 6 is a flow diagram of the operation of negative comments rules 502 of personality engine 104 of FIG. 5 in accordance with one embodiment of the present invention. Negative comments rules 502 include rules that are based on social-psychology empirical observations that (i) negative material is generally more arousing than positive material, (ii) people do not like others who criticize or blame, and (iii) people who blame themselves are seen and viewed as less competent. Accordingly, FIG. 6 is a flow diagram of the operation of negative comments rules 502 that implements these social-psychology empirical observations in accordance with one embodiment of the present invention.

At stage 602, it is determined whether a negative comment is currently required (i.e., whether voice user interface software 102 is at a stage of interaction with a user at which voice user interface software 102 needs to provide some type of negative comment to the user). If so, operation proceeds to stage 604.

At stage 604, it is determined whether there has been a failure (i.e., whether the negative comment is one that reports a failure). If so, operation proceeds to stage 606. Otherwise, operation proceeds to stage 608.

At stage 606, a prompt (e.g., a recorded prompt) that briefly states the problem or blames a third party is selected. This state the problem or blame a third party rule is based on a social-psychology empirical observation that when there is a failure, a system should neither blame the user nor take blame itself, but instead the system should simply state the problem or blame a third party. For example, at stage 606, a recorded prompt that states the problem or blames a third party is selected, such as "there seems to be a problem in getting your appointments for today" or "the third-party news service is not working right now" to the user.

At stage 608, the volume is lowered for audio data output to the user, such as speech output data 412, for the subsequent negative comment (e.g., recorded prompt) to be uttered by recorded speech software 411 of voice user interface software 102. This lower the volume rule is based on a social-psychology empirical observation that negative comments should generally have a lower volume than positive comments.

At stage 610, a brief comment (e.g., outputs a brief recorded prompt) is selected to utter as the negative comment to the user. This brief comment rule is based on a social-psychology empirical observation that negative comments should be shorter and less elaborate than positive comments.

Figure 7:
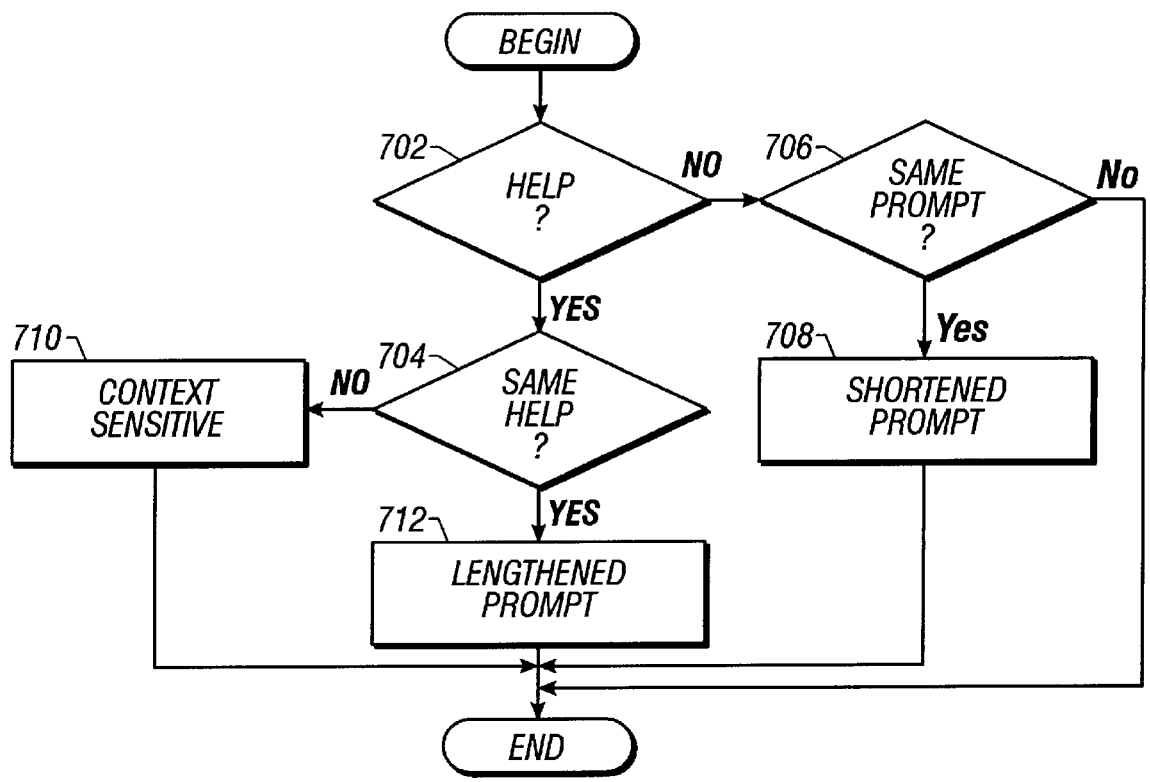
FIG. 7 is a flow diagram of the operation of the politeness rules of the personality engine of FIG. 5 in accordance with one embodiment of the present invention.

FIG. 7 is a flow diagram of the operation of politeness rules 504 of personality engine 104 of FIG. 5 in accordance with one embodiment of the present invention. Politeness rules 504 include rules that are based on Grice's maxims for politeness as follows: the quantity that a person should say during a dialog with another person should be neither more nor less than is needed, comments should be relevant and apply to the previous conversation, comments should be clear and comprehensible, and comments should be correct in a given context. Accordingly, FIG. 7 is a flow diagram of the operation of politeness rules 504 that implements Grice's maxims for politeness in accordance with one embodiment of the present invention.

At stage 702, it is determined whether help is required or requested by the user. If so, operation proceeds to stage 704. Otherwise, operation proceeds to stage 706.

At stage 704, it is determined whether the user is requiring repeated help in the same session or across sessions (i.e., a user is requiring help more than once in the current session). If so, operation proceeds to stage 712. Otherwise, operation proceeds to stage 710.

At stage 706, it is determined whether a particular prompt is being repeated in the same session (i.e., the same session with a particular user) or across sessions. If so, operation proceeds to stage 708. At stage 708, politeness rules 504 selects a shortened prompt (e.g., selects a shortened recorded prompt) for output by voice user interface software 102. This shortened prompt rule is based on a social-psychology empirical observation that the length of prompts should become shorter within a session and across sessions, unless the user is having trouble, in which case the prompts should become longer (e.g., more detailed).

At stage 712, a lengthened help explanation (e.g., recorded prompt) is selected for output by voice user interface software 102. For example, the lengthened help explanation can be provided to a user based on the user's help requirements in the current session and across sessions (e.g., personality engine 104 maintains state information for each user of computer system 100). This lengthened help rule is based on a social-psychology empirical observation that help explanations should get longer and more detailed both within a session and across sessions.

At stage 710, a prompt that provides context-sensitive help is selected for output by voice user interface software 102. For example, the context-sensitive help includes informing the user of the present state of the user's session and available options (e.g., an explanation of what the user can currently instruct the system to do at the current stage of operation). This context-sensitive help rule is based on a social-psychology empirical observation that a system should provide the ability to independently request, in a context-sensitive way, any of the following: available options, the present state of the system, and an explanation of what the user can currently instruct the system to do at the current stage of operation.

In one embodiment, a prompt is selected for output by voice user interface software 102, in which the selected prompt includes terms that are recognized by voice user interface with personality 103 (e.g., within the recognition grammar of the voice user interface with personality). This functionality is based on the social-psychology empirical observation that it is polite social behavior to use words introduced by the other person (in this case the voice user interface with personality) in conversation. Thus, this functionality is advantageous, because it increases the probability that a user will interact with voice user interface with personality 103 using words that are recognized by the voice user interface with personality. Politeness rules 504 can also include a rule that when addressing a user by name, voice user interface with personality 103 addresses the user by the user's proper name, which generally represents a socially polite manner of addressing a person (e.g., a form of flattery).

Another social-psychology empirical observation that can be implemented by politeness rules 504 and executed during the operation of politeness rules 504 appropriately is that when there is a trade-off between technical accuracy and comprehensibility, voice user interface with personality 103 should choose the latter. Yet another social-psychology empirical observation that can be implemented by politeness rules 504 and executed during the operation of politeness rules 504 appropriately is that human beings generally speak using varied responses (e.g., phrases) while interacting in a dialog with another human being, and thus, politeness rules 504 include a rule for selecting varied responses (e.g., randomly select among multiple recorded prompts available for a particular response) for output by voice user interface software 102.

Figure 8:
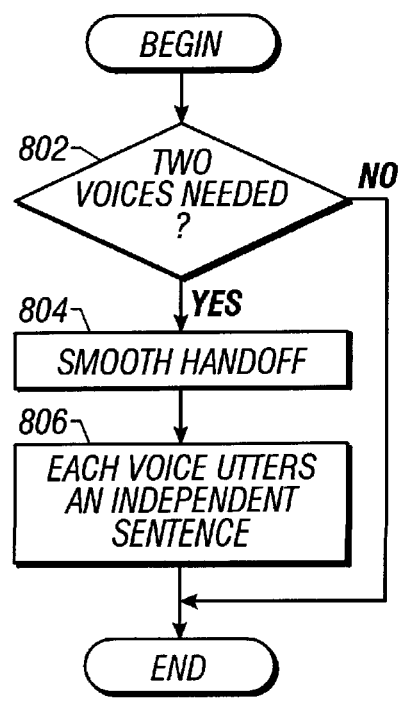
FIG. 8 is a flow diagram of the operation of the multiple voices rules of the personality engine of FIG. 5 in accordance with one embodiment of the present invention.

FIG. 8 is a flow diagram of the operation of multiple voices rules 506 of personality engine 104 of FIG. 5 in accordance with one embodiment of the present invention. Multiple voices rules 506 include rules that are based on the following social-psychology theories: different voices should be different social actors, disfluencies in speech are noticed, and disfluencies make the speakers seem less intelligent. Accordingly, FIG. 8 is a flow diagram of the operation of multiple voices rules 506 that implement these social-psychology theories in accordance with one embodiment of the present invention.

At stage 802, it is determined whether two voices are needed by voice user interface with personality 103 while interacting with a user. If two voices are desired, then operation proceeds to stage 804.

At stage 804, a smooth hand-off prompt is selected, which provides a smooth hand-off between the two voices to be used while interacting with the user. For example, a smooth hand-off is provided between the recorded voice output by the recorded speech software and the synthesized voice output by the TTS software. For example, voice user interface with personality 103 outputs "I will have your email read to you" to provide a transition between the recorded voice of recorded speech software 411 and the synthesized voice of TTS software 411. This smooth hand-off rule is based on a social-psychology empirical observation that there should be a smooth transition from one voice to another.

At stage 806, prompts are selected for output by each voice such that each voice utters an independent sentence. For each voice, an appropriate prompt is selected that is an independent sentence, and each voice then utters the selected prompt, respectively. For example, rather than outputting "[voice 1] Your email says [voice 2] . . . ", voice user interface with personality 103 outputs "I will have your email read to you" using the recorded voice of recorded speech software 411, and voice user interface with personality 103 outputs "Your current email says . . . " using the synthesized voice of TTS software 411. This independent sentences rule is based on a social-psychology empirical observation that two different voices should not utter different parts of the same sentence.

The personality engine can also implement various rules for a voice user interface with personality to invoke elements of team affiliation. For example, voice user interface with personality 103 can invoke team affiliation by outputting recorded prompts that use pronouns such as "we" rather than "you" or "I" when referring to tasks to be performed or when referring to problems during operation of the system. This concept of team affiliation is based on social-psychology empirical observations that indicate that a user of a system is more likely to enjoy and prefer using the system if the user feels a team affiliation with the system. For example, providing a voice user interface with personality that invokes team affiliation is useful and advantageous for a subscriber service, in which the users are subscribers of a system that provides various services, such as the system discussed below with respect to FIG. 9. Thus, a subscriber will likely be more forgiving and understanding of possible problems that may arise during use of the system, and hence, more likely to continue to be a subscriber of the service if the subscriber enjoys using the system through in part a team affiliation with the voice user interface with personality of the system.

The above discussed social-psychology empirical observations are further discussed and supported in *The Media Equation,* written by Byron Reeves and Clifford Nass, and published by CSLI Publications (1996).

A Voice User Interface With Personality For An Application

Figure 9:
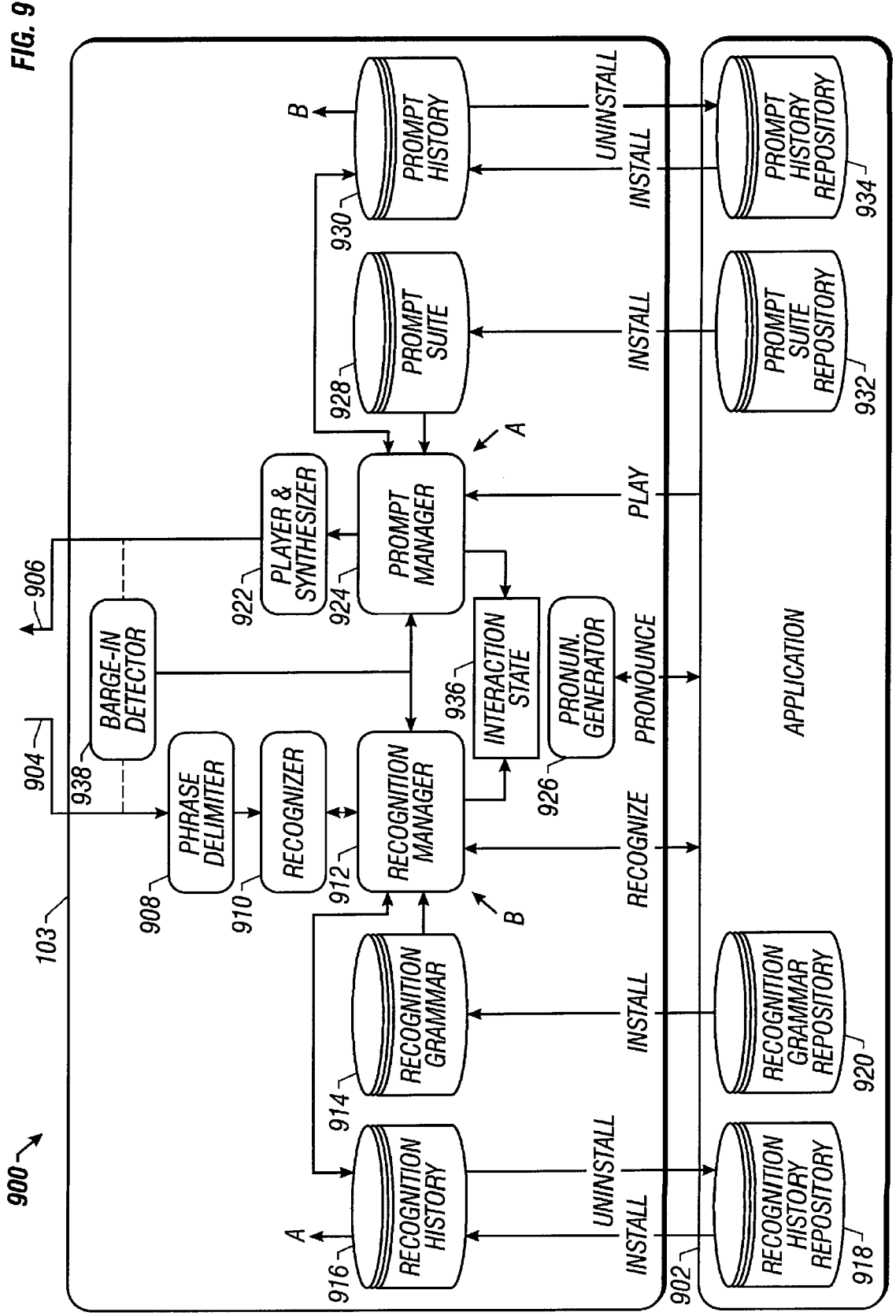
FIG. 9 is a block diagram of a voice user interface with personality for an application in accordance with one embodiment of the present invention.

FIG. 9 is a block diagram of a voice user interface with personality for an application in accordance with one embodiment of the present invention. System 900 includes a voice user interface with personality 103 shown in greater detail in accordance with one embodiment of the present invention. System 900 includes an application 902 that interfaces with voice user interface with personality 103.

Voice user interface with personality 103 can be stored in a memory of system 900. Voice user interface with personality 103 provides the user interface for application 902 executing on system 900 and interacts with users (e.g., subscribers and contacts of the subscribers) of a service provided by system 900 via input data signals 904 and output data signals 906.

Voice user interface with personality 103 represents a run-time version of voice user interface with personality 103 that is executing on system 900 for a particular user (e.g., a subscriber or a contact of the subscriber). Voice user interface with personality 103 receives input data signals 904 that include speech signals, which correspond to commands from a user, such as a subscriber. The voice user interface with personality recognizes the speech signals using a phrase delimiter 908, a recognizer 910, a recognition manager 912, a recognition grammar 914, and a recognition history 916. Recognition grammar 914 is installed using a recognition grammar repository 920, which is maintained by application 902 for all subscribers of system 900. Recognition history 916 is installed or uninstalled using a recognition history repository 918, which is maintained by application 902 for all of the subscribers of system 900. Input data signals 904 are received at phrase delimiter 908 and then transmitted to recognizer 910. Recognizer 910 extracts speech signals from input data signals 904 and transmits the speech signals to recognition manager 912. Recognition manager 912 uses recognition grammar 914 and recognition history 916 to recognize a command that corresponds to the speech signals. The recognized command is transmitted to application 902.

Voice user interface with personality 103 outputs data signals that include voice signals, which correspond to greetings and responses to the subscriber. The voice user interface with personality generates the voice signals using a player & synthesizer 922, a prompt manager 924, a pronunciation generator 926, a prompt suite 928, and a prompt history 930. Prompt suite 928 is installed using a prompt suite repository 932, which is maintained by application 902 for all of the subscribers of system 900. Prompt history 930 is installed or uninstalled using a prompt history repository 934, which is maintained by application 902 for all of the subscribers of system 900. Application 902 transmits a request to prompt manager 924 for a generic prompt to be output to the subscriber. Prompt manager 924 determines the interaction state using interaction state 936. Prompt manager 924 then selects a specific prompt (e.g., one of multiple prompts that correspond to the generic prompt) from a prompt suite 928 based on a prompt history stored in prompt history 930. Prompt manager 924 transmits the selected prompt to player and synthesizer 922. Player and synthesizer plays a recorded prompt or synthesizes the selected prompt for output via output data signals 906 to the subscriber.

The voice user interface with personality also includes a barge-in detector 938. Barge-in detector 938 disables output data signals 906 when input data signals 904 are detected.

For example, recognition grammar 914 includes the phrases that result from the scripting and recording of dialog for a virtual assistant with a particular personality. A phrase is anything that a user can say to the virtual assistant that the virtual assistant will recognize as a valid request or response. The grammar organizes the phrases into contexts or domains to reflect that the phrases the virtual assistant recognizes may depend upon the state of the user's interactions with the virtual assistant. Each phrase has both a specific name and a generic name. Two or more phrases (e.g., "Yes" and "Sure") can share the same generic name but not the same specific name. All recognition grammars define the same generic names but not necessarily the same specific names. Two recognition grammars can include different numbers of phrases and so define different numbers of specific names.

While a recognition grammar is created largely at design time, at run-time the application can customize the recognition grammar for the subscriber (e.g., with the proper names of his or her contacts). Pronunciation generator 926 allows for custom pronunciations for custom phrases and, thus, a subscriber-specific grammar. For example, pronunciation generator 926 is commercially available from Nuance Corporation of Menlo Park, Calif.

Recognition history 916 maintains the subscriber's experience with a particular recognition grammar. Recognition history 916 includes the generic and specific names of the phrases in the recognition grammar and the number of times the voice user interface with personality has heard the user say each phrase.

In one embodiment, application 902 allows the subscriber to select a virtual assistant that provides a voice user interface with a particular personality and which includes a particular recognition grammar. Application 902 preserves the selection in a non-volatile memory. To initialize the virtual assistant for a session with the subscriber or one of the subscriber's contacts, application 902 installs the appropriate recognition grammar 914. When initializing the virtual assistant, application 902 also installs the subscriber's recognition history 916. For the subscriber's first session, an empty history is installed. At the end of each session with the subscriber, application 902 uninstalls and preserves the updated history, recognition history 916.

The voice user interface with personality recognizes input data signals 904, which involves recognizing the subscriber's utterance as one of the phrases stored in recognition grammar 914, and updating recognition history 916 and interaction state 936 accordingly. The voice user interface with personality returns the generic and specific names of the recognized phrase.

In deciding what the subscriber says, the voice user interface with personality considers not only recognition grammar 914, but also both recognition history 916, which stores the phrases that the subscriber has previously stated to the virtual assistant, and prompt history 930, which stores the prompts that the virtual assistant previously stated to the subscriber.

Prompt suite 928 includes the prompts that result from the scripting and recording of a virtual assistant with a particular personality. A prompt is anything that the virtual assistant can say to the subscriber. Prompt suite 928 includes synthetic as well as recorded prompts. A recorded prompt is a recording of a human voice saying the prompt, which is output using player and synthesizer 922. A synthetic prompt is a written script for which a voice is synthesized when the prompt is output using player and synthesizer 922. A synthetic prompt has zero or more formal parameters for which actual parameters are substituted when the prompt is played. For example, to announce the time, application 902 plays "It's now <time>", supplying the current time. The script and its actual parameters may give pronunciations for the words included in the prompt. Prompt suite 928 may be designed so that a user attributes the recorded prompts and synthetic prompts (also referred to as speech markup) to different personae (e.g., the virtual assistant and her helper, respectively). Each prompt includes both a specific name (e.g., a specific prompt) and a generic name (e.g., a specific prompt corresponds to a generic prompt, and several different specific prompts can correspond to the generic prompt). Two or more prompts (e.g., "Yes" and "Sure") can share the same generic name but not the same specific name. All suites define the same generic names but not necessarily the same specific names. Two prompt suites can include different numbers of prompts and, thus, define different numbers of specific names.

For example, prompt suite 928 includes the virtual assistant's responses to the subscriber's explicit coaching requests. These prompts share a generic name. There is one prompt for each possible state of the virtual assistant's interaction with the user.

Although prompt suite 928 is created at design time, at run-time application 902 can customize prompt suite 928 for the subscriber (e.g., with the proper names of the subscriber's contacts using pronunciation generator 926 to generate pronunciations for custom synthetic prompts). Thus, prompt suite 928 is subscriber-specific.

Prompt history 930 documents the subscriber's experience with a particular prompt suite. Prompt history 930 includes the generic and specific names of the prompts stored in prompt suite 928 and how often the voice user interface with personality has played each prompt for the subscriber.

In one embodiment, application 902 allows the subscriber to select a virtual assistant and, thus, a voice user interface with a particular personality that uses a particular prompt suite. Application 902 preserves the selection in non-volatile memory. To initialize the selected virtual assistant for a session with the subscriber or a contact of the subscriber, application 902 installs the appropriate prompt suite. When initializing the virtual assistant, application 902 also installs the subscriber's prompt history 930. For the subscriber's first session, application 902 installs an empty history. At the end of each session, application 902 uninstalls and preserves the updated history.

Application 902 can request that the voice user interface with personality play for the user a generic prompt in prompt suite 928. The voice user interface with personality selects a specific prompt that corresponds to the generic prompt in one of several ways, some of which require a clock (not shown in FIG. 9) or a random number generator (not shown in FIG. 9), and updates prompt history 930 accordingly. For example, application 902 requests that the voice user interface with personality play a prompt that has a generic name (e.g., context-sensitive coaching responses), or application 902 requests that the voice user interface with personality play a prompt that has a particular generic name (e.g., that of an affirmation). In selecting a specific prompt that corresponds to the generic prompt, the voice user interface with personality considers both prompt history 930 (i.e., what the virtual assistant has said to the subscriber) and recognition history 916 (what the user has said to the virtual assistant). In selecting a specific prompt, the voice user interface with personality selects at random (e.g., to provided varied responses) one of two or more equally favored specific prompts.

Prompt suite 928 includes two or more greetings (e.g., "Hello", "Good Morning", and "Good Evening"). The greetings share a particular generic name. Application 902 can request that the voice user interface with personality play one of the prompts with the generic name for the greetings. The voice user interface with personality selects among the greetings appropriate for the current time of day (e.g., as it would when playing a generic prompt).

Prompt suite 928 includes farewells (e.g., "Good-bye" and "Good night"). The farewell prompts share a particular generic name. Application can request that the voice user interface with personality play one of the prompts with the generic name for the farewells. The voice user interface with personality selects among the farewells appropriate for the current time of day.

Application 902 can request that the voice user interface with personality play a prompt that has a particular generic name (e.g., a help message for a particular situation) and to select a prompt that is longer in duration than the previously played prompts. In selecting the longer prompt, the voice user interface with personality consults prompt history 930.

Application 902 can request that the voice user interface with personality play a prompt that has a particular generic name (e.g., a request for information from the user) and to select a prompt that is shorter in duration than the previously played prompts. In selecting the shorter prompt, the voice user interface with personality consults prompt history 930.

Application 902 can request that the voice user interface with personality play a prompt (e.g., a joke) at a particular probability and, thus, the voice user interface with personality sometimes plays nothing.

Application 902 can request that the voice user interface with personality play a prompt (e.g., a remark that the subscriber may infer as critical) at reduced volume.

Application 902 can request that the voice user interface with personality play an approximation prompt. An approximation prompt is a prompt output by the virtual assistant so that the virtual assistant is understood by the subscriber, at the possible expense of precision. For example, an approximation prompt for the current time of day can approximate the current time to the nearest quarter of an hour such that the virtual assistant, for example, informs the subscriber that the current time is "A quarter past four P.M." rather than overwhelming the user with the exact detailed time of "4:11:02 PM".

In one embodiment, application 902 provides various functionality including an email service, a stock quote service, a news content service, and a voice mail service. Subscribers access a service provided by system 900 via telephones or modems (e.g., using telephones, mobile phones, PDAs, or a standard computer executing a WWW browser such as the commercially available Netscape NAVIGATOR™ browser). System 900 allows subscribers via telephones to collect messages from multiple voice mail systems, scan voice messages, and manipulate voice messages (e.g., delete, save, skip, and forward). System 900 also allows subscribers via telephones to receive notification of email messages, scan email messages, read email messages, respond to email messages, and compose email messages. System 900 allows subscribers via telephones to setup a calendar, make appointments and to-do lists using a calendar, add contacts to an address book, find a contact in an address book, call a contact in an address book, schedule a new appointment in a calendar, search for appointments, act upon a found appointment, edit to-do lists, read to-do lists, and act upon to-do lists. System 900 allows subscribers via telephones to access various WWW content. System 900 allows subscribers to access various stock quotes. Subscribers can also customize the various news content, email content, voice mail content, and WWW content that system 900 provides to the subscriber. The functionality of application 902 of system 900 is discussed in detail in the product requirements document of microfiche Appendix C in accordance with one embodiment of the present invention.

System 900 advantageously includes a voice user interface with personality that acts as a virtual assistant to a subscriber of the service. For example, the subscriber can customize the voice user interface with personality to access and act upon the subscriber's voice mail, email, faxes, pages, personal information manager (PIM), and calendar (CAL) information through both a telephone and a WWW browser (e.g., the voice user interface with personality is accessible via the subscriber's mobile phone or telephone by dialing a designated phone number to access the service).

In one embodiment, the subscriber selects from several different personalities when selecting a virtual assistant. For example, the subscriber can interview virtual assistants with different personalities in order to choose the voice user interface with a personality that is best suited for the subscriber's needs, business, or the subscriber's own personality. A subscriber who is in a sales field may want an aggressive voice user interface with personality that puts incoming calls through, but a subscriber who is an executive may want a voice user interface with personality that takes more of an active role in screening calls and only putting through important calls during business hours. Thus, the subscriber can select a voice user interface with a particular personality.

As discussed above, to further the perception of true human interaction, the virtual assistant responds with different greetings, phrases, and confirmations just as a human assistant. For example, some of these different greetings are related to a time of day (e.g., "good morning" or "good evening"). Various humorous interactions are included to add to the personality of the voice user interface, as further discussed below. There are also different modes for the voice user interface with personality throughout the service. These different modes of operation are based on a social-psychology empirical observation that while some people like to drive, others prefer to be driven. Accordingly, subscribers can have the option of easily switching from a more verbose learning mode to an accelerated mode that provides only the minimum prompts required to complete an action. A virtual assistant that can be provided as a voice user interface with personality for system 900 is discussed in detail in microfiche Appendix D in accordance with one embodiment of the present invention.

Dialog

Figure 10:
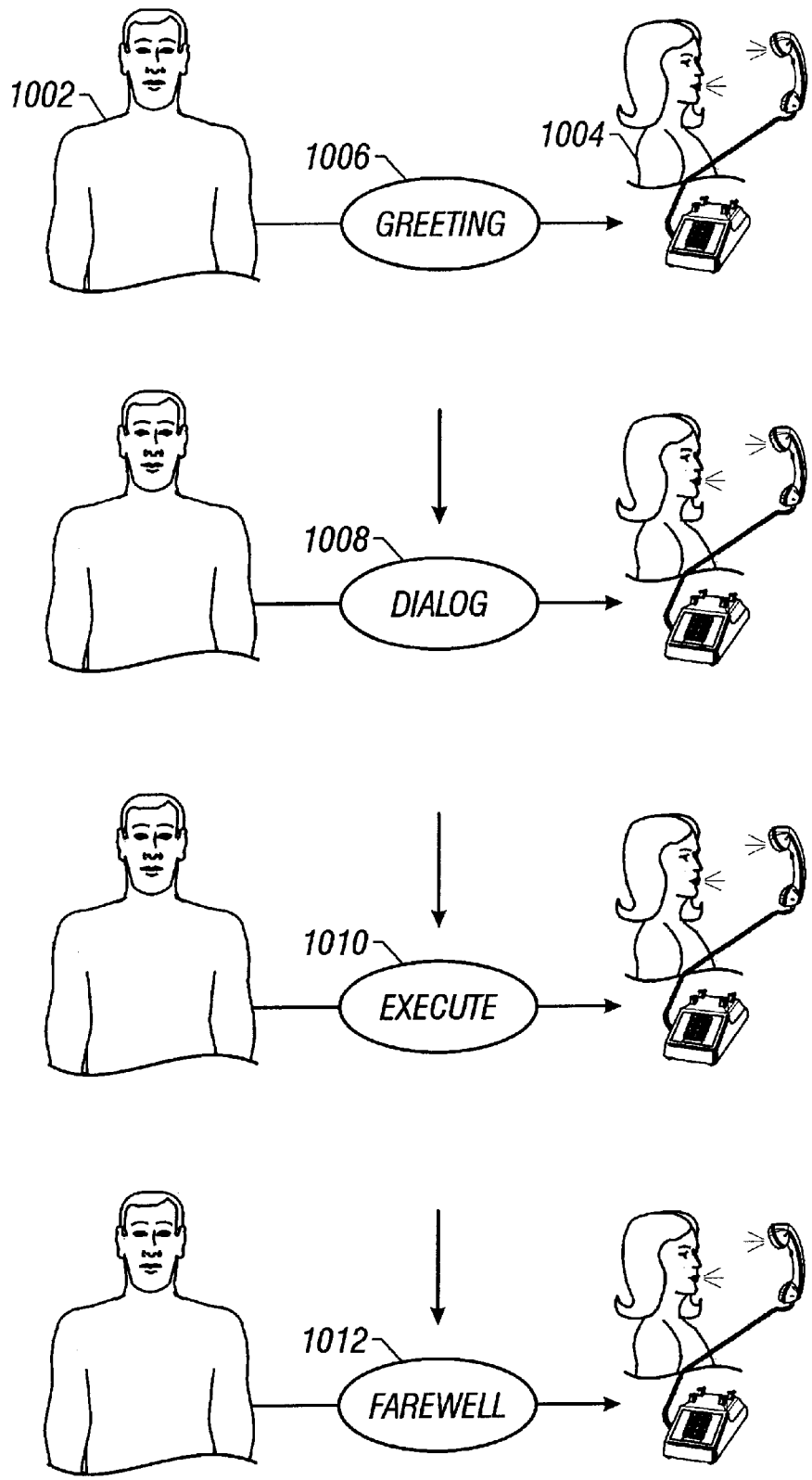
FIG. 10 is a functional diagram of a dialog interaction between the voice user interface with personality and a subscriber in accordance with one embodiment of the present invention.

FIG. 10 is a functional diagram of a dialog interaction between a voice user interface with personality 1002 (e.g., voice user interface with personality 103) and a subscriber 1004 in accordance with one embodiment of the present invention. When subscriber 1004 logs onto a system that includes voice user interface with personality 1002, such as system 900, voice user interface with personality 1002 provides a greeting 1006 to subscriber 1004. For example, greeting 1006 can be a prompt that is selected based on the current time of day.

Voice user interface with personality 1002 then interacts with subscriber 1004 using a dialog 1008, which gives subscriber 1004 the impression that the voice user interface of the system has a personality.

If subscriber 1004 selects a particular command provided by the system such as by speaking a command that is within the recognition grammar of voice user interface with personality 1002, then the system executes the command selection as shown at execute operation 1010.

Before subscriber 1004 logs off of the system, voice user interface with personality 1002 provides a farewell 1012 to subscriber 1004. For example, farewell 1012 can be a prompt that is selected based on the current time of day.

Figure 11:
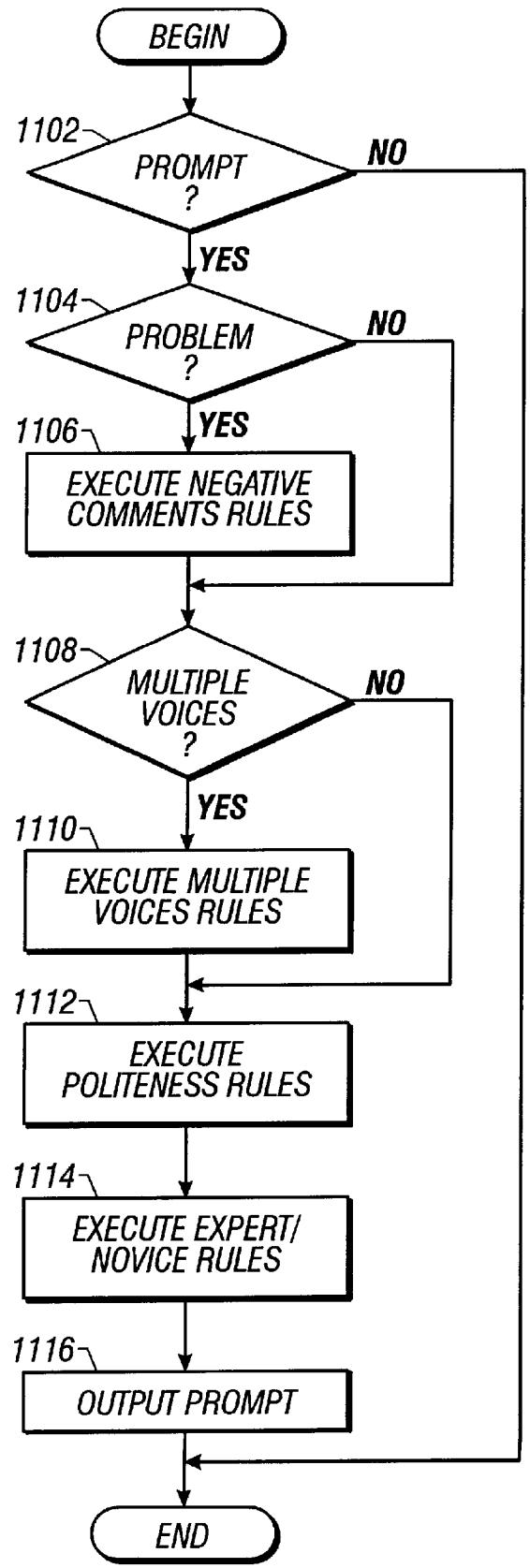
FIG. 11 is a flow diagram of the operation of the voice user interface with personality of FIG. 10 during an interaction with a subscriber in accordance with one embodiment of the present invention.

FIG. 11 is a flow diagram of the operation of voice user interface with personality 1002 of FIG. 10 during an interaction with a subscriber in accordance with one embodiment of the present invention. At stage 1102, voice user interface with personality 1002 determines whether a recorded prompt needs to be output to the subscriber. If so, operation proceeds to stage 1104.

At stage 1104, voice user interface with personality 1002 determines whether there is a problem (e.g., the user is requesting to access email, and the email server of the system is down, and thus, unavailable). If so, operation proceeds to stage 1106. Otherwise, operation proceeds to stage 1108. At stage 1106, voice user interface with personality 1002 executes negative comments rules (e.g., negative comments rules 502).

At stage 1108, voice user interface with personality 1002 determines whether multiple voices are required at this stage of operation during interaction with the subscriber (e.g., the subscriber is requesting that an email message be read to the subscriber, and TTS software 411 uses a synthesized voice to read the text of the email message, which is a different voice than the recorded voice of recorded speech software 411). If so, operation proceeds to stage 1110. Otherwise, operation proceeds to stage 1112. At stage 1110, voice user interface with personality 1002 executes multiple voices rules (e.g., multiple voices rules 506).

At stage 1112, voice user interface with personality 1002 executes politeness rules (e.g., multiple voices rules 504). At stage 1114, voice user interface with personality 1002 executes expert/novice rules (e.g., expert/novice rules 508). At stage 1116, voice user interface with personality 1002 outputs the selected prompt based on the execution of the appropriate rules.

As discussed above with respect to FIG. 9, system 900 includes functionality such as calendar functionality that, for example, allows a subscriber of system 900 to maintain a calendar of appointments. In particular, the subscriber can modify an appointment previously scheduled for the subscriber's calendar.

FIG. 12 provides a command specification of a modify appointment command for system 900 in accordance with one embodiment of the present invention. FIG. 12 shows the command syntax of the modify appointment command, which is discussed above. For example, a subscriber can command voice user interface with personality 1002 (e.g., the subscriber command the application through voice user interface with personality 1002) to modify an appointment by stating, "modify an appointment on June 13 at 3 p.m." The command syntax of FIG. 12 provides a parse of the modify appointment command as follows: "modify" represents the command, "appointment" represents the object of the command, "date" represents option1 of the command, and "time" represents option2 of the command. The subscriber can interact with voice user interface with personality 1002 using a dialog to provide a command to the system to modify an appointment.

Figure 13A:
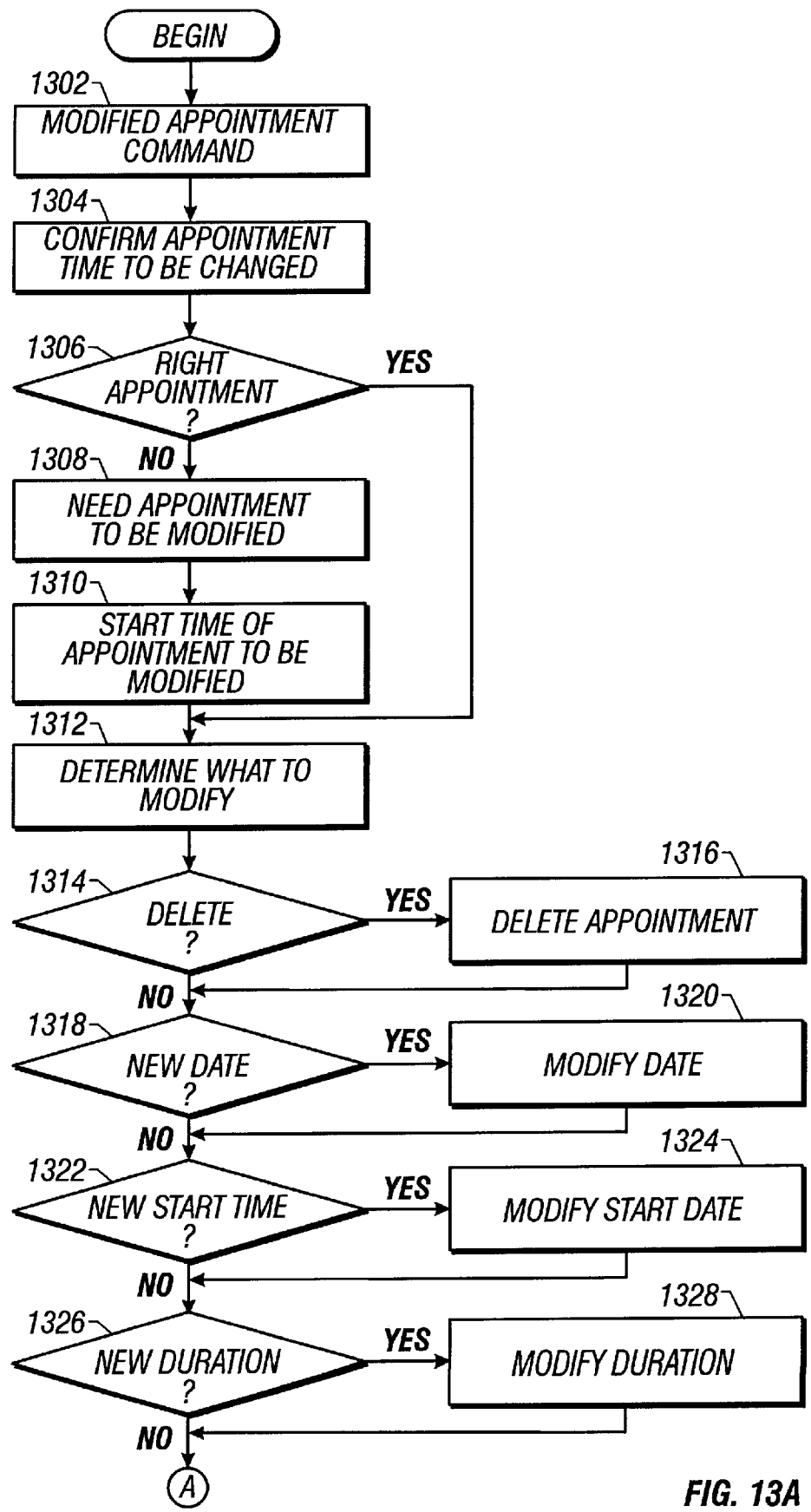
FIGS. 13A and 13B are a flow diagram of a dialog for a modify appointment command between the voice user interface with personality of FIG. 10 and a subscriber in accordance with one embodiment of the present invention.
Figure 13B:
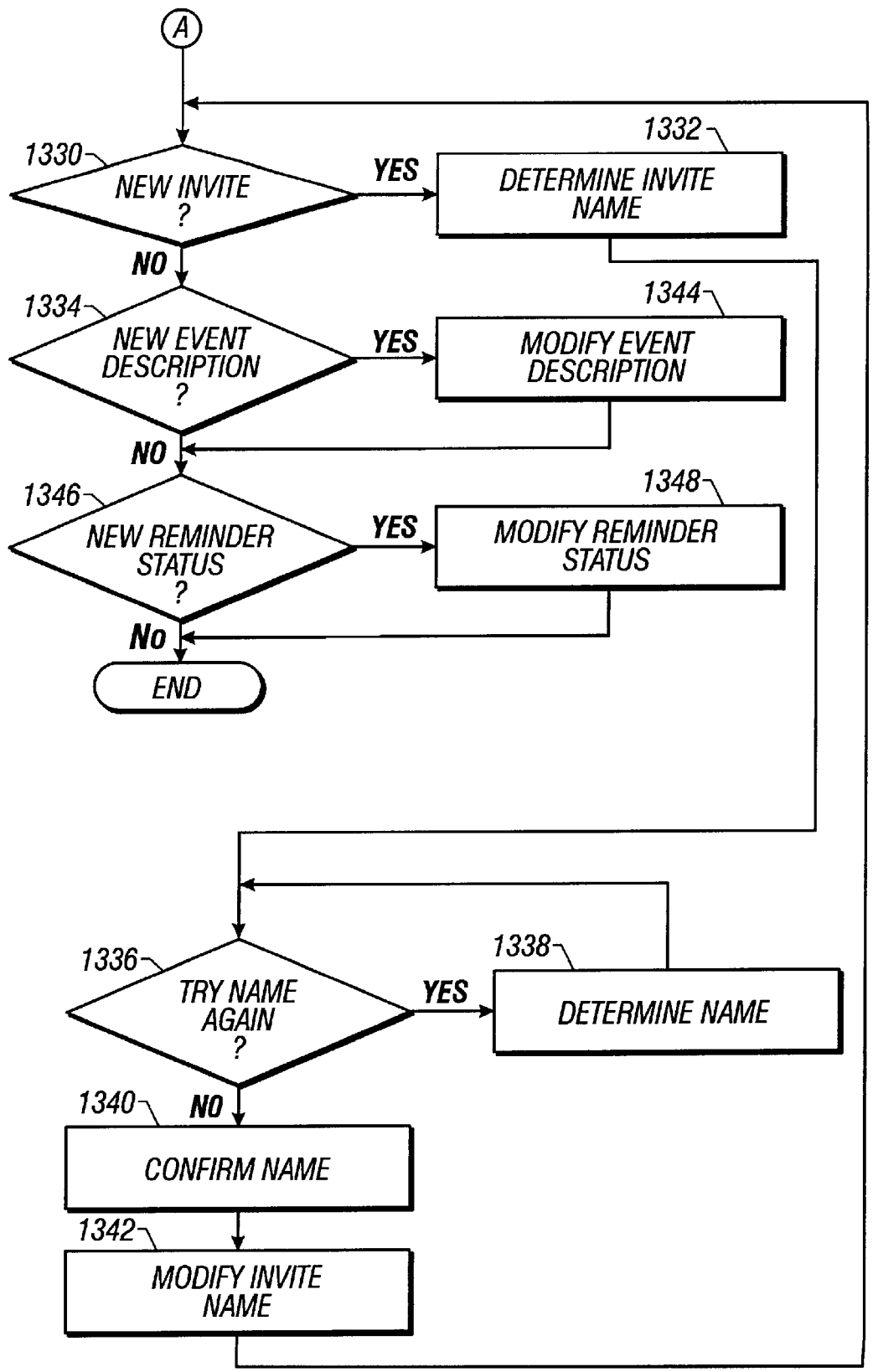

FIGS. 13A and 13B are a flow diagram of a dialog for a modify appointment command between voice user interface with personality 1002 and a subscriber in accordance with one embodiment of the present invention. The dialog for the modify appointment command implements the rules that provide a voice user interface with personality, as discussed above (e.g., negative comments rules 502, politeness rules 504, multiple voices rules 506, and expert/novice rules 508 of personality engine 104).

Referring to FIG. 13A, at stage 1302, voice user interface with personality 1002 recognizes a modify appointment command spoken by a subscriber. At stage 1304, voice user interface with personality 1002 confirms with the subscriber an appointment time to be changed.

At stage 1306, voice user interface with personality 1002 determines whether the confirmed appointment time to be changed represents the right appointment to be modified. If so, operation proceeds to stage 1312. Otherwise, operation proceeds to stage 1308. At stage 1308, voice user interface with personality 1002 informs the subscriber that voice user interface with personality 1002 needs the correct appointment to be modified, in other words, voice user interface with personality 1002 needs to determine the start time of the appointment to be modified. At stage 1310, voice user interface with personality 1002 determines the start time of the appointment to be modified (e.g., by asking the subscriber for the start time of the appointment to be modified).

At stage 1312, voice user interface with personality 1002 determines what parameters to modify of the appointment. At stage 1314, voice user interface with personality 1002 determines whether the appointment is to be deleted. If so, operation proceeds to stage 1316, and the appointment is deleted. Otherwise, operation proceeds to stage 1318. At stage 1318, voice user interface with personality 1002 determines whether a new date is needed, in other words, to change the date of the appointment to be modified. If so, operation proceeds to stage 1320, and the date of the appointment is modified. Otherwise, operation proceeds to stage 1322. At stage 1322, voice user interface with personality 1002 determines whether a new start time is needed. If so, operation proceeds to stage 1324, and the start time of the appointment is modified. Otherwise, operation proceeds to stage 1326. At stage 1326, voice user interface with personality 1002 determines whether a new duration of the appointment is needed. If so, operation proceeds to stage 1328, and the duration of the appointment is modified. Otherwise, operation proceeds to stage 1330. At stage 1330, voice user interface with personality 1002 determines whether a new invitee name is needed. If so, operation proceeds to stage 1332. Otherwise, operation proceeds to stage 1334. At stage 1332, voice user interface with personality 1002 determines the new invitee name of the appointment.

Referring to FIG. 13B, at stage 1336, voice user interface with personality 1002 determines whether it needs to try the name again of the invitee to be modified. If so, operation proceeds to stage 1338 to determine the name of the invitee to be modified. Otherwise, operation proceeds to stage 1340. At stage 1340, voice user interface with personality 1002 confirms the name of the invitee to be modified. At stage 1342, the invitee name is modified.

At stage 1334, voice user interface with personality 1002 determines whether a new event description is desired by the subscriber. If so, operation proceeds to stage 1344, and the event description of the appointment is modified appropriately. Otherwise, operation proceeds to stage 1346. At stage 1346, voice user interface with personality 1002 determines whether a new reminder status is desired by the subscriber. If so, operation proceeds to stage 1348, and the reminder status of the appointment is modified appropriately.

A detailed dialog for the modify appointment command for voice user interface with personality 1002 is provided in detail in Table A in accordance with one embodiment of the present invention. FIG. 14 shows an excerpt of Table A of the dialog for the modify appointment command of voice user interface with personality 1002. As shown in FIG. 14, the dialog for the modify appointment command is advantageously organized and arranged in four columns. The first column (left-most column) represents the label column, which represents a label for levels within a flow of control hierarchy during execution of voice user interface with personality 1002. The second column (second left-most column) represents the column that indicates what the user says as recognized by voice user interface with personality 1002 (e.g., within the recognition grammar of voice user interface with personality 1002, as discussed below). The third column (third left-most column) represents the flow control column. The flow control column indicates the flow of control for the modify appointment command as executed by voice user interface with personality 1002 in response to commands and responses by the subscriber and any problems that may arise during the dialog for the modify appointment command. The fourth column (right-most column) represents what voice user interface with personality 1002 says (e.g., recorded prompts output) to the subscriber during the modify appointment dialog in its various stages of flow control.

As shown in FIG. 14 (and further shown in Table A), the fourth column provides the dialog as particularly output by voice user interface with personality 1002. FIG. 14 also shows that voice user interface with personality 1002 has several options at various stages for prompts to play back to the subscriber. The dialog for the modify appointment command as shown in FIG. 14 and further shown in Table A is selected according to the rules that provide a voice user interface with personality, as discussed above. The four-column arrangement shown in FIG. 14 also advantageously allows for the generation of dialogs for various commands of a system, such as system 900, that can then easily be programmed by a computer programmer to implement voice user interface with personality 1002.

Script the Dialog

Based on the functional specification of a system such as system 900, a dialog such as the dialog specification discussed above, and in particular, a set of rules that define a voice user interface with personality such as the rules executed by personality engine 104, scripts are written for the dialog executed by voice user interface with personality 1002.

FIG. 15 shows scripts written for a mail domain (e.g., voice mail functionality) of application 902 of system 900 in accordance with one embodiment of the present invention. The left column of the table of FIG. 15 indicates the location of the flow of control of operation of voice user interface with personality 1002 within a particular domain (in this case the mail domain), in which the domains and flow of control of operation within domains are particularly specified in a finite state machine, as further discussed below.

Thus, within the mail domain, and within the mail_top_ navlist stage of flow control, voice user interface with personality 1002 can state any of seven prompts listed in the corresponding right column. For example, voice user interface with personality 1002 can select the first listed prompt and, thus, output to the subscriber, "What do you want me to do with your mail?". Voice user interface with personality 1002 can select the third listed prompt and then say to the subscriber, "Okay, mail's ready. How can I help you?". Or, voice user interface with personality 1002 can select the fifth listed prompt and, thus, output to the subscriber, "What would you like me to do?".

The various prompts selected by voice user interface with personality 1002 obey the personality specification, as described above. For example, voice user interface with personality 1002 can select among various prompts for the different stages of flow control within a particular domain using personality engine 104, and in particular, using negative comments rules 502, politeness rules 504, multiple voices rules 506, and expert/novice rules 508.

Varying the selection of various prompts within a session and across sessions for a particular subscriber advantageously provides a more human-like dialog between voice user interface with personality 1002 and the subscriber. Selection of various prompts can also be driven in part by a subscriber's selected personality type for voice user interface with personality 1002. For example, if the subscriber prefers a voice user interface with personality 1002 that lets the subscriber drive the use of system 900 (e.g., the subscriber has a driver type of personality), then voice user interface with personality 1002 can be configured to provide a friendly-submissive personality and to select prompts accordingly.

Voice user interface with personality 1002 can also use dialogs that include other types of mannerisms and cues that provide the voice user interface with personality, such as laughing to overcome an embarrassing or difficult situation. For example, within the mail domain and the gu_mail_ reply_recipient stage of flow control, the last listed prompt is as follows, "<Chuckle> This isn't going well, is it? Let's start over."

The prompts of application 902 are provided in microfiche Appendix E in accordance with one embodiment of the present invention.

The process of generating scripts can be performed by various commercially available services. For example, FunArts Software, Inc. of San Francisco, Calif., can write the scripts, which inject personality into each utterance of voice user interface with personality 1002.

Record the Dialog

After writing the scripts for the dialog of voice user interface with personality 1002, the scripts are recorded and stored (e.g., in a standard digital format) in a memory such as memory 101). In one embodiment, a process of recording scripts involves directing voice talent, such as an actor or actress, to generate interactive media, such as the dialogs for voice user interface with personality 1002.

First, an actor or actress is selected to read the appropriate scripts for a particular personality of voice user interface with personality 1002. The actor or actress is selected based upon their voice and their style of delivery. Then, using different timbres and pitch ranges that the actor or actress has available, a character voice for voice user interface with personality 1002 is generated and selected for each personality type. Those skilled in the art of directing voice talent will recognize that some of the variables to work with at this point include timbre, pitch, pace, pronunciation, and intonation. There is also an overall task of maintaining consistency within the personality after selecting the appropriate character voice.

Second, the scripts are recorded. Each utterance (e.g., prompt that can be output by voice user interface with personality 1002 to the subscriber) can be recorded a number of different times with different reads by the selected actor or actress. The director maintains a detailed and clear image of the personality in his or her mind in order to keep the selected actor or actress "in character". Accordingly, maintaining a sense of the utterances within all the possible flow of control options is another important factor to consider when directing non-linear interactive media, such as the recording of scripts for voice user interface with personality 1002. For example, unlike narrative, non-linear interactive media, such as the dialog for voice user interface with personality 1002, does not necessarily have a predefined and certain path. Instead, each utterance works with a variety of potential pathways. User events can be unpredictable, yet the dialog spoken by voice user interface with personality 1002 should make sense at all times, as discussed above with respect to FIG. 7.

A certain degree of flexibility and improvisation in the recording process may also be desirable as will be apparent to those skilled in the art of generating non-linear interactive media. However, this is a matter of preference for the director. Sometimes the script for an utterance can be difficult to pronounce or deliver in character and can benefit from a spur of the moment improvisation by the actor or actress. Often the short, character-driven responses that surround an utterance such as a confirmation can respond to the natural sounds of the specific actor. Creating and maintaining the "right" feeling for the actor is also important during the recording of non-linear media. Because the actor or actress is working in total isolation, without the benefit of other actors or actresses to bounce off of, or a coherent story line, and the actor or actress is often reading from an unavoidably technical script, it is important that the director maintain a close rapport with the selected actor or actress during recording and maintain an appropriate energy level during the recording process.

Figure 16:
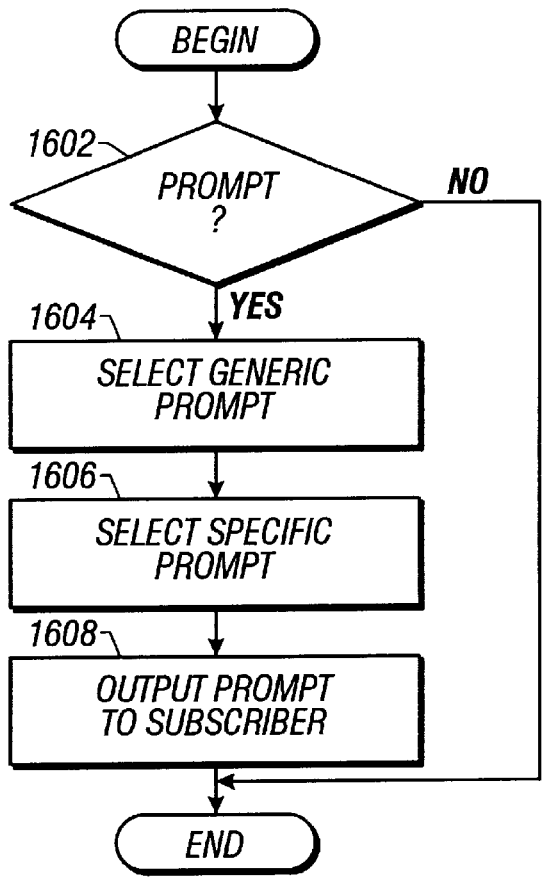
FIG. 16 is a flow diagram for selecting and executing a prompt by the voice user interface with personality of FIG. 10 in accordance with one embodiment of the present invention.

FIG. 16 is a flow diagram for selecting and executing a prompt by voice user interface with personality 1002 in accordance with one embodiment of the present invention. At stage 1602, voice user interface with personality 1002 determines whether or not a prompt is needed. If so, operation proceeds to stage 1604. At stage 1604, application 902 requests that voice user interface with personality outputs a generic prompt (e.g., provides a generic name of a prompt).

At stage 1606, voice user interface with personality 1002 selects an appropriate specific prompt (e.g., a specific name of a prompt that corresponds to the generic name). A specific prompt can be stored in a memory, such as memory 101, as a recorded prompt in which different recordings of the same prompt represent different personalities. For example, voice user interface with personality 1002 uses a rules-based engine such as personality engine 104 to select an appropriate specific prompt. The selection of an appropriate specific prompt can be based on various factors, which can be specific to a particular subscriber, such as the personality type of voice user interface with personality 1002 configured for the subscriber and the subscriber's expertise with using voice user interface with personality 1002. At stage 1608, voice user interface with personality outputs the selected specific prompt to the subscriber.

Figure 17:
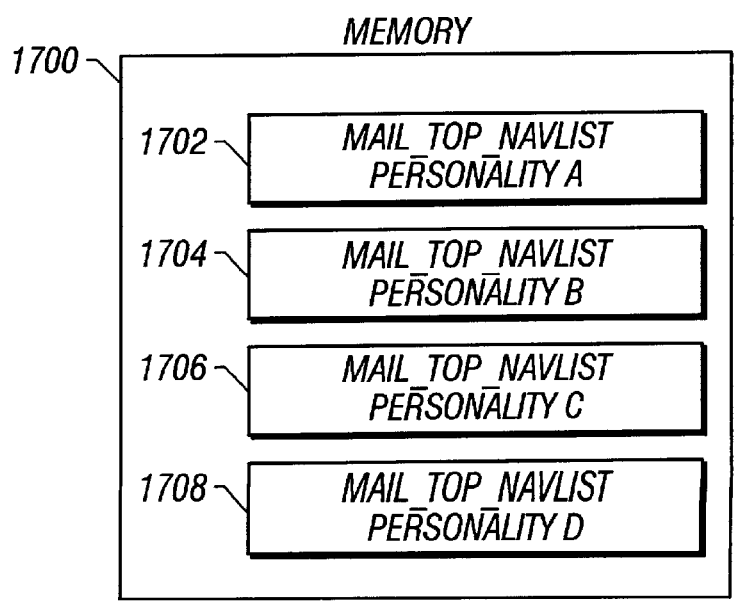
FIG. 17 is a block diagram of a memory that stores recorded prompts in accordance with one embodiment of the present invention.

FIG. 17 is a block diagram of a memory 1700 that stores recorded scripts in accordance with one embodiment of the present invention. Memory 1700 stores recorded scripts for the mail domain scripts of FIG. 15, and in particular, for the stage of flow of control of mail_top_navlist for various personality types, as discussed above. Memory 1700 stores recorded mail_top_navlist scripts 1702 for a friendly-dominant personality, recorded mail_top_navlist scripts 1704 for a friendly-submissive personality, recorded mail_top navlist scripts 1706 for an unfriendly-dominant personality, and recorded mail_top_navlist scripts 1708 for an unfriendly-submissive personality.

In one embodiment, recorded mail_top_navlist scripts 1702, 1704, 1706, and 1708 can be stored within personality engine 104 (e.g., in prompt suite 928). Personality engine 104 selects an appropriate recorded prompt among recorded mail_top_navlist scripts 1702, 1704, 1706, and 1708. The selection of recorded mail top_navlist scripts 1702, 1704, 1706, and 1708 by personality engine 104 can be based on the selected (e.g., configured) personality for voice user interface with personality 1002 for a particular subscriber and based on previously selected prompts for the subscriber within a current session and across sessions (e.g., prompt history 930). For example, personality engine 104 can be executed on computer system 100 and during operation of the execution perform such operations as select prompt operation 1604 and select recorded prompt operation 1606.

The process of recording scripts can be performed by various commercially available services. For example, FunArts Software, Inc. of San Francisco, Calif., writes scripts, directs voice talent in reading the scripts, and edits the audio tapes of the recorded scripts (e.g., to adjust volume and ensure smooth audio transitions within dialogs).

Finite State Machine Implementation

Based upon the application of a system, a finite state machine implementation of a voice user interface with personality is generated. A finite state machine is generated in view of an application, such as application 902 of system 900, and in view of a dialog, such as dialog 1008 as discussed above. For a computer-implemented voice user interface with personality, the finite state machine implementation should be generated in a manner that is technically feasible and practical for coding (programming).

Figure 18:
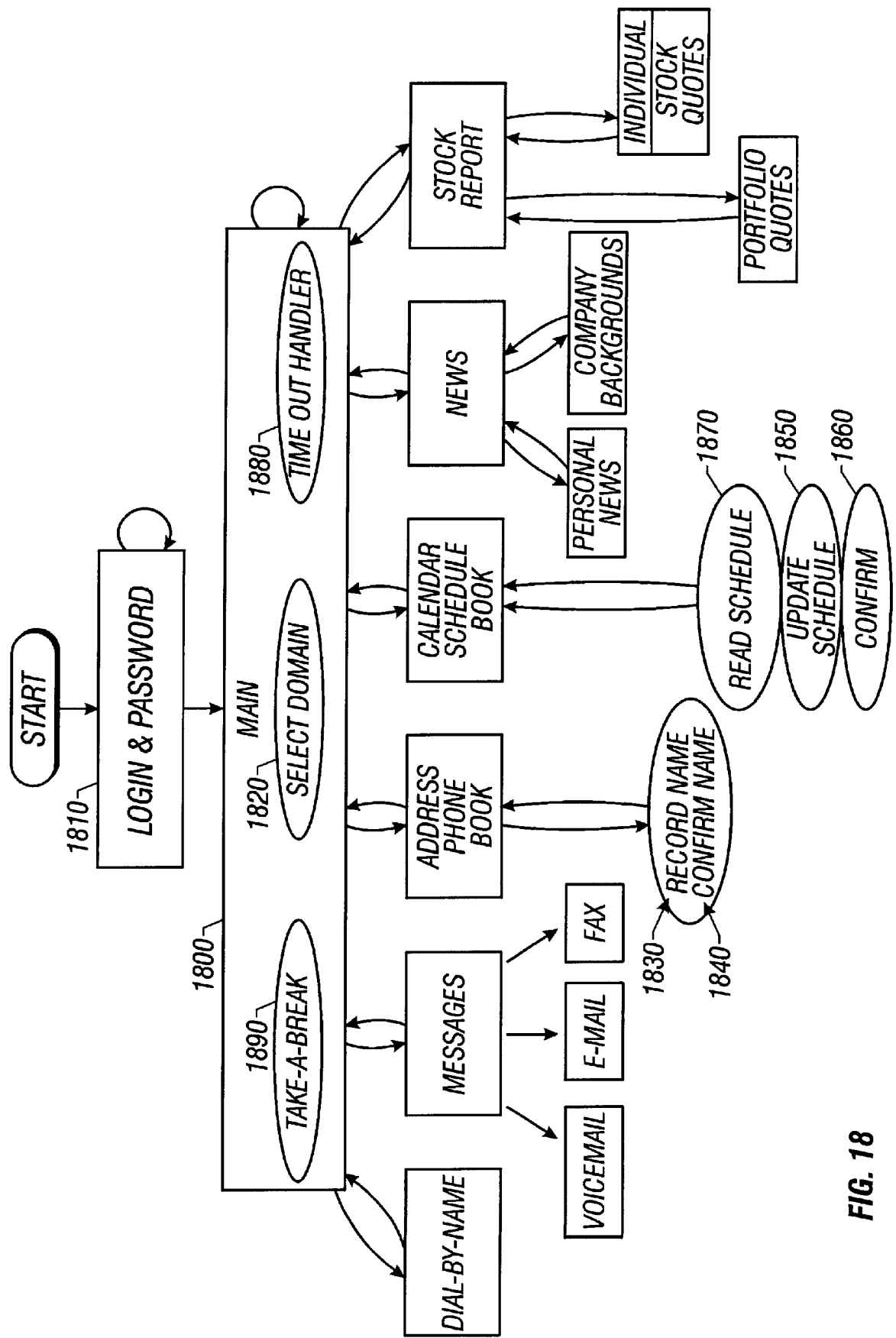
FIG. 18 is a finite state machine diagram of the voice user interface with personality of FIG. 10 in accordance with one embodiment of the present invention.

FIG. 18 is a finite state machine diagram of voice user interface with personality 1002 in accordance with one embodiment of the present invention. Execution of the finite state machine begins at a login and password state 1810 when a subscriber logs onto system 900. After a successful logon, voice user interface with personality 1002 transitions to a main state 1800. Main state 1800 includes a time-out handler state 1880 for time-out situations (e.g., a user has not provided a response within a predetermined period of time), a take-a-break state 1890 (e.g., for pausing), and a select domain state 1820.

From select domain state 1820, voice user interface with personality 1002 determines which domain of functionality to proceed to next based upon a dialog (e.g., dialog 1008) with a subscriber. For example, the subscriber may desire to record a name, in which case, voice user interface with personality 1002 can transition to a record name state 1830. When executing record name state 1830, voice user interface with personality 1002 transitions to a record name confirm state 1840 to confirm the recorded name. If the subscriber desires to update a schedule, then voice user interface with personality 1002 can transition to an update schedule state 1850. From update schedule state 1850, voice user interface with personality 1002 transitions to an update schedule confirm state 1860 to confirm the update of the schedule. The subscriber can also request that voice user interface with personality 1002 read a schedule, in which case, voice user interface with personality 1002 transitions to a read schedule state 1870 to have voice user interface with personality 1002 have a schedule read to the subscriber.

A finite state machine of voice user interface with personality 1002 for application 902 of system 900 is represented as hyper text (an HTML listing) in microfiche Appendix F in accordance with one embodiment of the present invention.

Recognition Grammar

Voice user interface with personality 1002 includes various recognition grammars that represent the verbal commands (e.g., phrases) that voice user interface with personality 1002 can recognize when spoken by a subscriber. As discussed above, a recognition grammar definition represents a trade-off between accuracy and performance as well as other possible factors. It will be apparent to one of ordinary skill in the art of ASR technology that the process of defining various recognition grammars is usually an iterative process based on use and performance of a system, such as system 900, and voice user interface with personality 1002.

Figure 19:
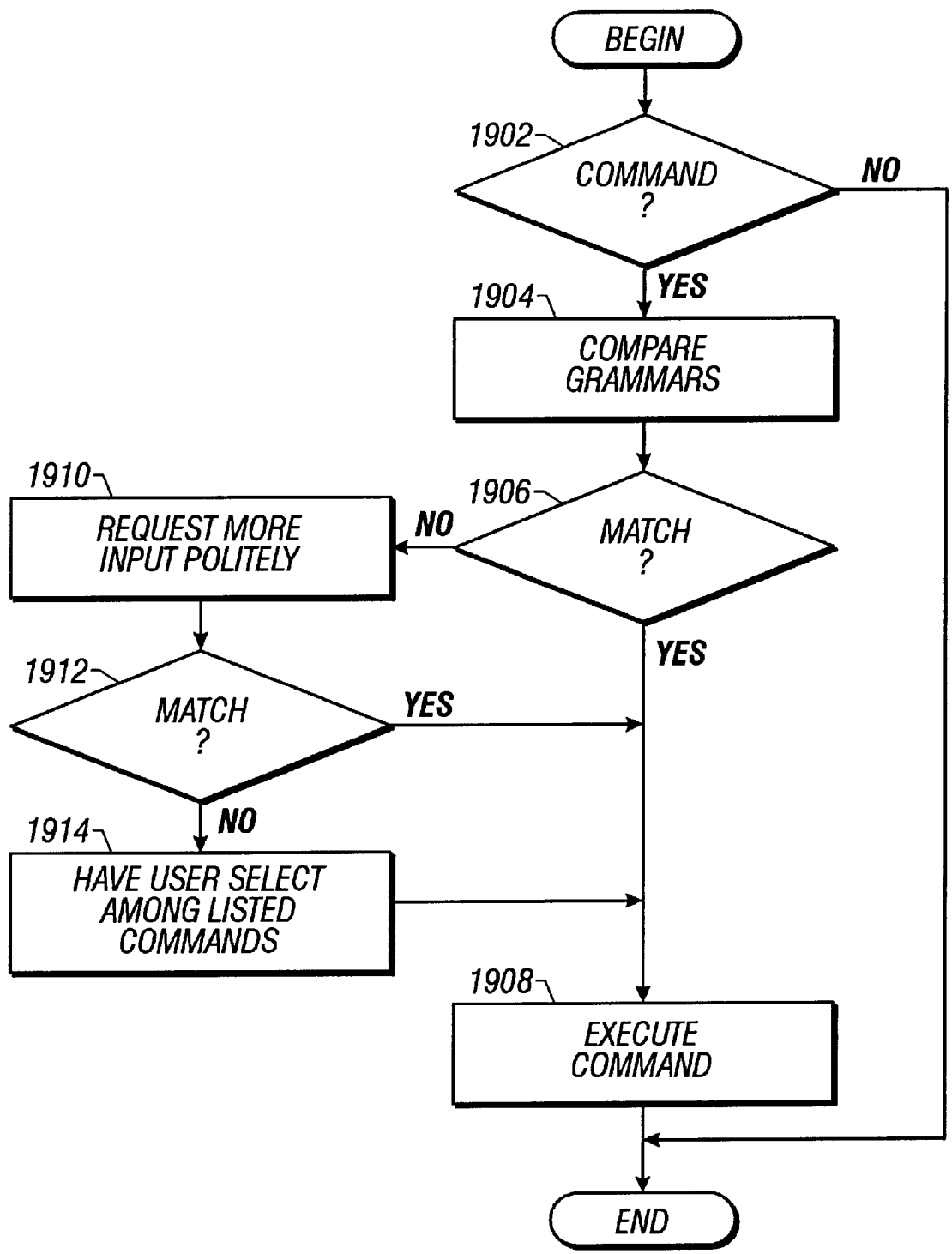
FIG. 19 is a flow diagram of the operation of the voice user interface with personality of FIG. 10 using a recognition grammar in accordance with one embodiment of the present invention.

FIG. 19 is a flow diagram of the operation of voice user interface with personality 1002 using a recognition grammar in accordance with one embodiment of the present invention. At stage 1902, voice user interface with personality 1002 determines whether or not a subscriber has issued (e.g., spoken) a verbal command. If so, operation proceeds to stage 1904. At stage 1904, voice user interface with personality 1002 compares the spoken command to the recognition grammar.

At stage 1906, voice user interface with personality 1002 determines whether there is a match between the verbal command spoken by the subscriber and a grammar recognized by voice user interface with personality 1002. If so, operation proceeds to stage 1908, and the recognized command is executed.

In one embodiment, at stage 1904, voice user interface with personality 1002 use the recognition grammar to interpret the spoken command and, thus, combines stages 1904 and 1906.

Otherwise, operation proceeds to stage 1910. At stage 1910, voice user interface with personality 1002 requests more information from the subscriber politely (e.g., executing politeness rules 504).

At stage 1912, voice user interface with personality 1002 determines whether or not there is a match between a recognition grammar and the verbal command spoken by the subscriber. If so, operation proceeds to stage 1908, and the recognized command is executed.

Otherwise, operation proceeds to stage 1914. At stage 1914, voice user interface with personality 1002 requests that the subscriber select among various listed command options that are provided at this point in the stage of flow of control of a particular domain of system 900. Operation then proceeds to stage 1908 and the selected command is executed.

A detailed recognition grammar for application 902 of system 900 is provided in microfiche Appendix G in accordance with one embodiment of the present invention.

Recognition grammars for a system such as system 900 can be defined in a grammar definition language (GDL) and the recognition grammars specified in GDL can then be automatically translated into machine executable grammars using commercially available software. For example, ASR software is commercially available from Nuance Corporation of Menlo Park, Calif.

Computer Code Implementation

Based on the finite state machine implementation, the selected personality, the dialog, and the recognition grammar (e.g., GDL), all discussed above, voice user interface with personality 1002 can be implemented in computer code that can be executed on a computer, such as computer system 100, to provide a system, such as system 900, with a voice user interface with personality, such as voice user interface with personality 1002. For example, the computer code can be stored as source code or compiled and stored as executable code in a memory, such as memory 101.

A "C" code implementation of voice user interface with personality 1002 for application 902 of system 900 is provided in detail in microfiche Appendix H in accordance with one embodiment of the present invention.

Accordingly, the present invention provides a voice user interface with personality. For example, the present invention can be used to provide a voice user interface with personality for a telephone system that provides various functionality and services, such as an email service, a news content service, a stock quote service, and a voice mail service. A system that includes a voice user interface or interacts with users via telephones or mobile phones would significantly benefit from the present invention.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

TABLE A

MODIFY APPOINTMENT

| Label | User Says | Flow Control | Computer Says |
|---|---|---|---|
| #0 start | | <OBJECT> is filled with "appointment" and <COMMAND> contains "modify" If <OPTION1> is filled or <OPTION2> is filled, goto T_NEEDAPPOINTMENT | |

TABLE A-continued

MODIFY APPOINTMENT

| Label | User Says | Flow Control | Computer Says |
|---|---|---|---|
| | | Get LAST APPOINTMENT CHANGED | TTS: The last appointment was <say appointment>. Is that the appointment you want to change? |
| S_RIGHTAPPOINTMENTa | 'yes' | set <OPTION1> to date and <OPTION2> to time; go to T_WHATTOMODIFY | |
| a | or 'no' | say A:; null out <OPTION1> and <OPTION2>; goto T_NEEDAPPOINTMENT | |
| a | or 'help' | goto T_HELP | |
| a | or TIMEOUT | say A:; goto S_RIGHTAPPOINTMENT | A: Hurry up and say something. |
| a | or BAD_SCORE | If failure_count <4, say A and goto S_RIGHTAPPOINTMENT or else say B and goto MainDialog | A; I couldn't understand that. B: I give up. Going back to main menu. |
| T_NEEDAPPOINTMENT | | If <OPTION1> is filled, goto T_STARTTIME | PROMPT FOR INPUT, e.g. 'What's the date of the appointment you'd like to modify?' "Okay. Tell me the date and I can pull that information up for you" "Okay. Give me the date and we'll take a look." "Okay. Give me the date and I'll check your calendar." |
| S DATE b | [date] | Goto S_STARTTIME | |
| b | or 'help' | goto HELP | |
| b | or 'get me out of here' | Say A: Let STATUS = return code of done; If DONE = GONE, clean up; stop the procedure; If DONE = OPPS, say B:; goto S_DATE | A: Okay. What would you like to do now? B: You're back in MODIFY APPOINTMENT. Que pasa? |
| b | or TIMEOUT | say A:; goto S_DATE | A: Here's what you can do |
| b | or BAD_SCORE | If failure_count <4, say A and goto S_DATE or else say B and goto MainDialog | A; I couldn't understand that. B: I give up. Going back to main menu. |
| T_STARTTIME | | If <OPTION2> is filled goto DOESAPPOINTMENTEXIST | PROMPT FOR INPUT, e.g. "Now, tell me the start time" |
| S_STARTTIMEc | [start time] | Goto DOESAPPOINTMENTEXIST; | |
| c | or 'help' | goto HELP | |
| c | or 'get me out of here' | Say A: Call MAIN DIALOG with DONE; Let STATUS = return code of DONE; If DONE = GONE, clean up; stop the procedure; If DONE = OPPS, say B:; goto S_STARTTIME | A: Okay. What would you like to do now? B: You're back in MODIFY APPOINTMENT. Que pasa? |
| c | or TIMEOUT | say A:; goto S_STARTTIME | A: Here's what you can do |
| c | or BAD_SCORE | If failure_count <4, say A and goto | A; I couldn't understand that. |

TABLE A-continued

MODIFY APPOINTMENT

| Label | User Says | Flow Control | Computer Says |
|---|---|---|---|
| | | S_STARTTIME or else say B and goto MainDialog | B: I give up. Going back to main menu. |
| DOESAPPOINTMENTEXIST | | If time mentioned is not within the time of an actual appointment <OPTION1> = NULL <OPTION2> = NULL say A and go to S_DATE | A: "I don't see an appointment at that time. What's the date of the appointment?" "I'm not seeing anything on your schedule at that time. Let me take another look. "I don't see anything scheduled for that time. Let me look again. (note: needs branching on the return to #1...) |
| | | If there is only one appointment at this time, go to T_WHATTOMODIFY FINDAPPOINTMENTLIST (<DATE> <STARTTIME>) returns APPOINTMENT INDEX. Make believe appointment index was spoken (actually there's no dialog). | |
| | NOTONLIST | Say A; goto MAIN DIALOG | A: Okay. I won't modify any of your appointments." |
| | or index for actual appointment | Set <OPTION1> and <OPTION2> to the time and date of the appointment that was selected; goto T_WHATTOMODIFY | |
| | or GETMEOUT OF HERE | say A: GOTO Main Dialog | A: I'm history. See you later. |
| | or NOISEONLINE | Say A; Goto MainDialog | A: I give up. Going back to main menu. |
| T_WHATTOMODIFY | | | PROMPT FOR INPUT, e.g. "What do you want to change?" "What would you like to change?" |
| S_WHATTOMODIFYz | 'delete' | | CONFIRM THEY WANT TO DELETE: "Are you sure you want to delete this appointment?" |
| SHOULDDELETEd | 'Yes' | Delete appointment; Say A; Say B: goto S_WHATTOMODIFY | A: "Done. I've deleted the appointment." "Done. That appointment is history." "Done. It's outta here." B: What else would you like to change? If nothing, just say 'no changes.' |
| d | or 'No' | Say A and go to S_WHATTOMODIFY | A: 'No problem... Let's leave it then. What else would you like to change? If you don't want to change anything, just say 'no |

TABLE A-continued

MODIFY APPOINTMENT

| Label | User Says | Flow Control | Computer Says |
|---|---|---|---|
| | | | changes'" |
| d | or 'help' | goto T_HELP | |
| d | or BAD_SCORE | If failure_count <4 say A and goto S_SHOULDDELETE or else say B and goto MainDialog | A: I couldn't understand that. Do you want to delete or not? B: I give up. Going back to main menu. |
| d | or 'get me out of here' | Say A: Call MAIN DIALOG with DONE; Let STATUS = return code of DONE; If DONE = GONE, clean up; stop the procedure; If DONE = OPPS, say B:; goto S_SHOULDDELETE | A: Okay. What would you like to do now? B: You're back in MODIFY APPOINTMENT. Que pasa? |
| d | or TIMEOUT | Say A:; goto S_SHOULDDELETE | A: Here's what you can do |
| z | or 'date' | | CONFIRM THEY WANT TO CHANGE DATE: "Okay, what's a good day for you?" "You're appointment is currently on [day] [month] [date]. Tell me the new date." "Right now your appointment is scheduled for [month] [date]. Tell me the new date." "Okay, when do you want to reschedule you're appointment?" "Tell me the new date." "What date do you want to move it to?" |
| S_NEWDATEe | [date] | Change date in the database; say A; say B: goto S_WHATTOMODIFY | A: "All right. I'll reschedule your appointment for [day] [month] [date]" B: What else would you like to change? If nothing, just say 'no changes' |
| e | or 'help' | goto T_HELP | |
| e | or BAD_SCORE | If failure_count <4 say A and goto S_NEWDATE; or else say B and goto MainDialog | A: I couldn't understand that. What's the new date? B: I give up. Going back to main menu. |
| e | or 'get me out of here' | Say A: Call MAIN DIALOG with DONE; Let STATUS = return code of DONE; If DONE = GONE, clean up; stop the procedure; If DONE = OPPS, say B:; goto S_NEWDATE | A: Okay. What would you like to do now? B: You're back in MODIFY APPOINTMENT. Que pasa? |
| e | or TIMEOUT | say A:; goto S_NEWDATE | A: Here's what you can do |
| z | or 'start time' | | CONFIRM THEY WANT TO CHANGE THE START TIME: |

TABLE A-continued

MODIFY APPOINTMENT

| Label | User Says | Flow Control | Computer Says |
|---|---|---|---|
| | | | "Right now, you're scheduled to start at [start time]. When would you rather start?" |
| | | | "At the moment, you're scheduled to start at [start time]. When would you rather start?" |
| S_NEWSTARTf | [start time] | Set start time; say A:; say B; goto S_WHATTOMODIFY | A: TTS: Your new start time is [start time]. B: What else would you like to change? If nothing, just say 'no changes.' |
| f | or 'help' | goto T_HELP | |
| f | or BAD_SCORE | If failure_count <4 say A and goto S_NEWSTART; or else say B and goto MainDialog | A: I couldn't understand that. What's the new start time? B: I give up. Going back to main menu. |
| f | or 'get me out of here' | Say A: Call MAIN DIALOG with DONE; Let STATUS = return code of DONE; If DONE = GONE, clean up; stop the procedure; If DONE = OPPS, say B:; goto S_NEWSTART | A: Okay. What would you like to do now? B: You're back in MODIFY APPOINTMENT. Que pasa? |
| f | or TIMEOUT | say A:; goto S_NEWSTART | A: Here's what you can do |
| z | or 'duration' | | CONFIRM THEY WANT TO CHANGE DURATION "Currently, your appointment's scheduled to run for [duration] hour (s). How many hours would you like it to last?" "Currently, your appointment runs for [duration] hour (s). How many hours would you like it to last?" |
| S_DURATIONg | [duration] | say A: say B; goto S_WHATTOMODIFY | A: "All right, I'll reschedule the appointment to end at [end time]. B: What else would you like to change? If nothing, just say 'no changes.' |
| g | or 'help' | goto T_HELP | |
| g | or BAD_SCORE | If failure_count <4 say A and goto S_DURATION; or else say B and goto MainDialog | A: I couldn't understand that. What's the duration? B: I give up. Going back to main menu. |
| g | or 'get me out of here' | Say A: Call MAIN DIALOG with DONE; Let STATUS = return code of DONE; If DONE = GONE, clean up; stop the procedure; If DONE = OPPS, say B:; | A: Okay. What would you like to do now? B: You're back in MODIFY APPOINTMENT. Que pasa? |

TABLE A-continued

MODIFY APPOINTMENT

| Label | User Says | Flow Control | Computer Says |
|---|---|---|---|
| | | goto S_DURATION | |
| g | or TIMEOUT | say A:; goto S_DURATION | A: Here's what you can do |
| z | or 'who is invited' | | PROMPT FOR INPUT: "Would you like to add someone to the list or remove someone from the list?" |
| S_CHANGEINVITEh | 'add' | Set ACTION=Add; Say A; go to INVITENAME | A: Please give the name of the person you want to add. |
| h | or 'remove' | Set ACTION=REMOVE; Say A goto INVITENAME | A: Please give the name of the person you want to remove. |
| h | or 'help' | GOTO T_HELP | |
| h | or 'get me out of here' | Say A: Call MAIN DIALOG with DONE; Let STATUS = return code of DONE; If DONE = GONE, clean up; stop the procedure; If DONE = OPPS, say B:; goto S_CHANGEINVITE | A: Okay. What would you like to do now? B: You're back in MODIFY APPOINTMENT. Que pasa? |
| h | or TIMEOUT | say A:; goto S_CHANGEINVITE | A: Here's what you can do |
| h | or BAD_SCORE | If failure count <4 say A and goto S_CHANGEINVITE or else say B and goto MainDialog | A: I couldn't understand that. What do you want to do? B: I give up. Going back to main menu. |
| INVITENAME | | Get response from user FINDNAMEINLIST <name> <NAMEINDEX> For convenience, make believe that <NAMEINDEX> was a response | |
| i | HELP | goto T_HELP | |
| i | Or NOONE | Say A:; goto S_WHATTOMODIFY | A: Okay. What else would you like to modify? |
| i | or NOTFOUND OR NOT IN LIST | | A: I'm sorry. I could not find that name. Would you like to give a different name?. |
| TRYNAMEAGAINj | 'yes' | IF ACTION = ADD, Say A:, goto INVITENAME If ACTION = DELETE, Say B; goto INVITENAME | A: Okay. Who would you like to add? B: Okay. Who would you like to delete? |
| j | or 'no' | Say A:; Goto S_WHATTOMODIFY | A: Okay. What would you like to do? |
| j | or 'get me out of here' | Say A: Call MAIN DIALOG with DONE; Let STATUS = return code of DONE; If DONE = GONE, | A: Okay. What would you like to do now? B: You're back in MODIFY APPOINTMENT. Que pasa? |

TABLE A-continued

MODIFY APPOINTMENT

| Label | User Says | Flow Control | Computer Says |
|---|---|---|---|
| | | clean up; stop the procedure; If DONE = OPPS, say B:; goto S_TRYNAMEAGAIN | |
| j | or TIMEOUT | Say A:; goto S_TRYNAMEAGAIN | A: Here's what you can do |
| j | or 'help' | goto T_HELP | |
| j | or BAD SCORE | IF BS_count <4 say A and goto 57 or else say B and goto MainDialog | A: "Sorry, I didn't catch that. Please say yes or no." B: SUPPLY PROMPT FOR MAIN DIALOG, e.g. 'Let's start again.' |
| j | a valid name index | | TTS: The name I found is [name]. Is that correct?. |
| S_CONFIRMNAMEk | 'yes' | If ACTION = ADD; Say A:, PEOPLELIST = PEOPLELIST && NAME; say B:; goto S_WHATTOMODIFY; If ACTION = REMOVE, Say A:; PEOPLELIST = PEOPLELIST -- NAME; say B; goto S_WHATTOMODIFY | A: Okay. B: What else would you like to change? If nothing, just say 'no changes.' |
| | or 'no' | Say A:; goto INVITENAME | A: Sorry. Please repeat then name. |
| k | or 'get me out of here' | Say A: Call MAIN DIALOG with DONE; Let STATUS = return code of DONE; If DONE = GONE, clean up; stop the procedure; If DONE = OPPS, say B:; goto S_CONFIRMNAME | A: Okay. What would you like to do now? B: You're back in MODIFY APPOINTMENT. Que pasa? |
| k | or TIMEOUT | say A:; goto S_CONFIRMNAME | A: Here's what you do |
| k | or 'help' | goto T_HELP | |
| k | Or BAD SCORE | If BS_count <4 say A and goto S_CONFIRMNAME; or else say B and goto MainDialog | A: "Sorry, I didn't catch that. Is the name correct?" B: SUPPLY PROMPT FOR MAIN DIALOG, e.g. 'Let's start again.' |
| i | 'noise on line' | goto Main Dialog | |
| z | or 'event description' | | "Let's record a quick reminder. At the tone, tell me how you would describe the meeting. When you're T_FINISHed, press the pound key or say 'stop recording'..." |
| S_EVENTDESC1 | 'staff meeting' | MEETTYPE = "staff meeting" | |
| l | or 'lunch' | MEETTYPE = "lunch" | |
| l | or 'weekly status meeting' | MEETTYPE = "weekly status meeting" | |

TABLE A-continued

MODIFY APPOINTMENT

| Label | User Says | Flow Control | Computer Says |
|---|---|---|---|
| l | or 'get me out of here' | Say A:<br>Call MAIN DIALOG with DONE;<br>Let STATUS = return code of DONE;<br>If DONE = GONE, clean up; stop the procedure;<br>If DONE = OPPS, say B:;<br>goto S_EVENTDESC | A: Okay. What would you like to do now?<br>B: You're back in MODIFY APPOINTMENT. Que pasa? |
| l | or TIMEOUT | say A:;<br>goto S_EVENTDESC | A: Here's what you can do |
| l | or ANYTHING ELSE | MEETTYPE = "none";<br>store input as recording; say A:;<br>goto S_WHATTOMODIFY | A: Okay. I've got the event description. What else do you want to modify? |
| z | or 'reminder' | Check reminder status<br>If reminder=yes, say A;<br>If reminder=no, say B. | A: You have a reminder set for xxx minutes before the appointment. Would you like to keep the reminder?<br>B: You do not have a reminder set. Would you like to have a reminder? |
| S_REMINDERSTATUSm | 'yes' | | A: How many minutes before would you like to be reminded? |
| S_MINUTESn | [minutes] | set the reminder for [minutes] before;<br>say A:<br>goto S_WHATTOMODIFY | A: Okay. What else would you like to do to the appointment? |
| n | or TIMEOUT | say A:;<br>goto S_MINUTES | A: Here's what you can do |
| n | or 'help' | goto T_HELP | |
| n | or BAD SCORE | If BS_count <4 say A and goto S_MINUTES or else say B and goto MainDialog | A: "Sorry, I didn't catch that. Is the name correct?"<br>B: SUPPLY PROMPT FOR MAIN DIALOG, e.g. 'Let's start again.' |
| m | or 'no' | Turn off reminder;<br>say A:;<br>goto S_WHATTOMODIFY | A: You won't get a reminder for this appointment. What would you like to change now? |
| m | or TIMEOUT | say A:;<br>goto S_REMINDERSTATUS | A: Here's what you can do |
| m | or 'help' | goto T_HELP | |
| m | or BAD SCORE | If BS_count <4 say A and goto S_REMINDERSTATUS or else say B and goto MainDialog | A: "Sorry, I didn't catch that. Is the name correct?"<br>B: SUPPLY PROMPT FOR MAIN DIALOG, e.g. 'Let's start again.' |
| z | or 'done' or 'no changes' | say A:;<br>goto T_FINISH | A: Okay. You're done changing the appointment. |
| T_FINISH | | If MEETTYPE <> "none," say A<br>If MEETTYPE = "none," say B | A: TTS: "You're confirmed for your [time] [a.m./p.m.] appointment on [day], [date]. It will end at [Duration] + [StartTime]. The purpose of the appointment is [play |

TABLE A-continued

MODIFY APPOINTMENT

| Label | User Says | Flow Control | Computer Says |
|---|---|---|---|
| | | | meeting type]. The people invited are [say PEOPLELIST]. If you want to change anything about this appointment at any time, just say 'modify appointment'." |
| | | | B: TTS: "You're confirmed for your [time] [a.m./p.m.] appointment on [day], [date].]. It will end at [Duration] + [StartTime]. The purpose of the appointment is [play]. The people invited are [say PEOPLELIST]. If you want to change anything about this appointment at any time, just say 'modify appointment'." |
| | | Check for conflict. If there is a conflict, say A. | A: The meeting you just created conflicts with the following meeting. If you want to resolve the conflict, just say read appointment and you can decide which appointment you want to modify. |
| | | Goto MainDialog | |
| T_HELP | | | "Here's how to schedule an appointment. I'll ask you the data and time of the appointment, who it's with and what it's about, and give you the chance to confirm that all the information is correct. If you want to stop at any time, say 'forget it'. If you want to continue, say 'keep going'." |
| S_HELPo o o | 'keep going' or 'help' or BAD_SCORE | return to the place where they left off goto T_HELP If BS_count <4 say A and goto S_HELP or else say B and goto MainDialog | A: "Sorry, I didn't catch that. Please say 'forget it', 'keep going' or 'help'." B: SUPPLY PROMPT FOR MAIN DIALOG, e.g. 'Let's start again.' |
| 96o | or TIMEOUT | say A:; goto S_HELP | A: Here's what you can do |
| 97o | or BAD SCORE | If BS_count <4 say A and goto S_HELP or else say B and goto MainDialog | A: "Sorry, I didn't catch that. Is the name correct? B: SUPPLY PROMPT FOR MAIN DIALOG, e.g. 'Let's start again.' |

TABLE B

Welcome Domain

| | |
|---|---|
| top_welcome_messageconfirm | Before I send your message, you can play it back, delete it and try again, or send it as it is.<br>T1:<br>To review your message, just tell me to "play it back". If you want, we can record it over again. Say "delete it" and then I'll set you up to re. If it's okay as it is, you can hang up.<br>(Thanks!)<br>To make sure the message is exactly how you want it, you can "play it back," "delete it" then record a new message, or "mark it urgent" and I'll deliver it A.S.A.P. If it's okay as is, go ahead and hang up. Thanks!<br>T2, T3 Silent |
| rej_main_select | I'm sorry. I didn't catch that. Say all my mail, my voicemail, my email, a contact, my appointments, my news, news about a company, my quotes, or a quote from a particular company.<br>R1<br>I missed that, I'm sorry. Could you repeat it please?<br>Would you repeat that for me please?<br>R2<br>Sorry, I didn't understand that. Please point me in the direction you want to go. Say all my mail, my voicemail, my email, a contact, my appointments, my news, news about a company, my quotes, or a quote from a particular company.<br>R3<br>I'm still not understanding you, Sorry! One more time - Please say all my mail, my voicemail, my email, a contact, my appointments, my news, news about a company, my quotes, or a quote from a particular company. |
| rej_main_update_schedule | I'm sorry. I didn't catch that. Say at work, at home, mobile, unavailable, on schedule, or tell the phone number where you will be.<br>R1<br>Where did you say you'll be?<br>Where did you say I could reach you?<br>R2<br>I'm sorry. I wasn't able to understand you. Please tell me again where you'll be. Say WORK, HOME, MOBILE, ON SCHEDULE or UNAVAILABLE. Or, if you like, you can leave a phone number. If you need more help, say HELP.<br>R3<br>My apologies, there might be noise on the line that's preventing me from hearing you properly. Say WORK, HOME, MOBILE, ON SCHEDULE, or UNAVAILABLE. Or if you like, you can leave a phone number. If you need more help, say HELP. Hmmm, I'm not sure what the problem is. Let's try this one last time. say WORK, HOME, MOBILE, ON SCHEDULE, or UNAVAILABLE. Hope this works! |
| mail_top_navlist | What do you want me to do with your mail? Ready. What can I do for you? Okay, mail's ready. How can I help you? I'm looking at your messages on my monitor. What would you like me to do? Okay, ready. Tell me what you'd like me to do.<br>What can I do for you? |
| mail_tutorial | Let me tell you about your mail inbox, and what I can do for you.<br>IN PROGRESS<br>We'll probably spend a lot of our time working with your messages. Your inbox handles all three kinds of messages; voice, email and fax. First, I can play your messages to you. I'll sort them into lists, which I can play to you straight through, or you can move through the list using the commands 'next', 'previous', 'first', 'last' and 'repeat'. I can delete any message we're currently listening to, or else I'll automatically save it for you in your 'old' mail file. After you've listened to a message, I can call the person back for you or email a response to them, as long as we have the contact information for them in the address book.<br>When you ask me to read you your messages, I'll tell you how many messages you have then I'll put them in a list, starting with the most recent. Say 'play' to start listening to your messages. Once you've heard a new message, it's automatically saved as an old one unless you specifically ask me to delete it. You can navigate through the list of messages by saying 'next', 'previous', 'first', 'last' or 'repeat'. To pick up where you left off before asking for help, say 'keep going'. When you're finished with your messages, say 'done'. When you say 'Get my new messages'... |
| bst_mail_navlist | Still there? Say next, read it, delete it, or call them back.<br>For more options, say help.<br>Time Out 1:<br>Mail's ready. Tell me what you'd like to do.<br>I've got your messages ready. What would you like to do?<br>I've got your inbox up on the monitor. What would you like to do?<br>Time Out 2:<br>Hello? Still there? We'd just started to deal with your messages. Tell me what you want me to do with them - Say 'PLAY IT' to hear your first message, next to hear the next one, and so on. For some reason I can't hear you. If you're still there, here are your options. Say 'next' to hear the next message. Say 'previous' to hear the previous one. Of course, I'll save everything you don't have me delete. Otherwise, if you need help, say 'help'.<br>I'm not sure if you said anything - sorry if I'm repeating |
| top_main_firsttime | What can I do for you?<br>How can I help you?<br>What would you like to do? |
| top_main | What else can I do for you?<br>T1:<br>Anything else I can do for you?<br>Is there anything else I can help you with?<br>What else can I help you with?<br>Anything else I can help you with?<br>What else would you like to do?<br>Anything else you'd like me to do for you?<br>T2, T3 Silent |

TABLE B-continued

Welcome Domain

| | |
|---|---|
| bst_main | Still there? Say Call, Voicemail, Address Book, Find, Email, Calendar, News, Quotes, or Schedule a Meeting.<br>T1:<br>Anything else I can help you with? What else would you like to do? Anything else you'd like me to do for you? What else can I help you with?<br>T2:<br>Sorry, I couldn't hear your reply. Was there anything else I can help you with? Hmmm, I'm not hearing you properly for some reason. Was there anything I can do for you?<br>T3:<br>There might be a problem on this line, all I'm getting is silence. Can I help you with anything? Get your messages? Check your Calendar? Look up a phone number? Just let me know. |
| rej_main | I'm sorry. I didn't catch that. Say Call, Voicemail, Address Book, Find, Email, Calendar, News, Quotes, or Schedule a Meeting.<br>R1:<br>Could you repeat that please? Sorry, I couldn't understand what you said. Would you repeat it for me please? Your reply got scrambled for some reason. Could you repeat it for me please?<br>R2:<br>Okay, for some reason I'm not hearing you. Tell me, is there anything I can do for you. Please say "Call," "Voicemail," "Address Book," "Find," "Email," "Calendar," "News, "Quotes," or "Schedule a Meeting."<br>R3:<br>I'm really sorry this isn't working better. Let's try it one last time. Say 'CALENDAR', 'ADDRESSBOOK', 'NEWS' or any of the other commands. Or you can always say HELP. Let's try one last time, then I'll cancel out of this. Please tell me what you'd like to do. Say 'CALENDAR', 'ADDRESSBOOK', 'NEWS', or any of the other commands. Or you can always say |

What is claimed is:

1. An apparatus for a voice user interface with personality, the apparatus comprising:
   logic that provides a voice user interface, the voice user interface outputting first voice signals, and the voice user interface recognizing speech signals;
   logic that provides a personality, the logic that provides the personality interfacing with the logic that provides the voice user interface to provide the voice user interface with a verbal personality; and
   a recognition grammar stored in a memory, the recognition grammar comprising multiple phrases that a virtual assistant with a personality can recognize when spoken by a user, and the recognition grammar being selected based on the personality of the virtual assistant.

2. The apparatus as recited in claim 1 wherein the logic that provides the voice user interface and the logic that provides the personality comprise computer software stored in a memory of a computer system, the computer software being executed on a processor of the computer system.

3. The apparatus as recited in claim 2 wherein the computer system comprises a microphone and speaker, the speech signals being received from the microphone, and the first voice signals being transmitted to the speaker.

4. The apparatus as recited in claim 2 wherein the computer system is in communication with a telephone, the speech signals being received from the telephone, and the first voice signals being transmitted to the telephone.

5. The apparatus as recited in claim 2 wherein the computer system comprises at least two computers.

6. The apparatus as recited in claim 2 wherein the computer system comprises:
   a telephone line card in communication with a telephone line for receiving speech input data from a user and speech output data from the logic that provides the voice user interface.

7. The apparatus as recited in claim 6 wherein the computer system further comprises:
   a network card, the network card in communication with a network.

8. The apparatus as recited in claim 1 wherein the voice user interface with personality comprises a virtual assistant with personality.

9. The apparatus as recited in claim 8 wherein the personality of the virtual assistant comprises a predetermined tone or cadence of the first voice signals, a predetermined vocabulary, a predetermined sentence construction, or a predetermined degree of assertiveness.

10. The apparatus as recited in claim 8 wherein the first voice signals comprise a prompt, the prompt being scripted for the personality of the virtual assistant.

11. The apparatus as recited in claim 8 wherein the first voice signals comprise a recorded prompt, the recorded prompt being acted and recorded for the personality of the virtual assistant.

12. The apparatus as recited in claim 1 wherein the logic that provides the personality comprises randomly selecting a prompt from multiple prompts available to provide a predetermined response.

13. The apparatus as recited in claim 1 wherein the logic that provides the personality comprises selecting a prompt, the prompt comprising an appropriate temporal prompt.

14. The apparatus as recited in claim 1 wherein the logic that provides the personality comprises selecting a prompt, the prompt comprising a term that was previously spoken by the user in a recognized command.

15. The apparatus as recited in claim 1 wherein the logic that provides the voice user interface comprises recognizing multiple spoken commands as a predetermined command.

16. The apparatus as recited in claim 1 wherein the logic that provides the voice user interface comprises generating second voice signals, the second voice signals comprising synthesized voice signals that correspond to text.

17. The apparatus as recited in claim 1 wherein the logic that provides the personality selects a smooth hand-off prompt to provide a smooth hand-off between the first voice signals and second voice signals, the second voice signals being output by the logic that provides the voice user interface.

18. The apparatus as recited in claim 17 wherein the logic that provides the personality selects a first complete sentence for output by the first voice signals and a second complete sentence for output by the second voice signals.

19. The apparatus as recited in claim 18 wherein the first voice signals comprise the voice of a virtual assistant, and the second voice signals comprise the voice of a helper to the virtual assistant.

20. The apparatus as recited in claim 19 wherein the second voice signals comprise recorded voice signals.

21. The apparatus as recited in claim 19 wherein the second voice signals comprise synthesized voice signals.

22. The apparatus as recited in claim 1 wherein the logic that provides the personality comprises controlling the selection of the first voice signals output by the voice user interface such that the voice user interface with personality behaves consistently with social and emotional norms, including politeness, while interacting with the user.

23. The apparatus as recited in claim 22 wherein the first voice signals comprise a word that is within a recognition grammar of the voice user interface.

24. The apparatus as recited in claim 22 wherein the logic that provides the personality comprises controlling the selection of the first voice signals output by the voice user interface such that the voice user interface with personality addresses a user by a proper name of the user.

25. The apparatus as recited in claim 22 wherein the voice user interface with personality suggests responses available to the user that are polite and socially appropriate, thereby permitting the user to be polite and socially appropriate while interacting with the voice user interface with personality.

26. The apparatus as recited in claim 1 wherein the logic that provides the personality comprises controlling the voice user interface in situations in which negative comments are needed.

27. The apparatus as recited in claim 26 wherein the logic that provides the personality comprises selecting a negative prompt, the negative prompt comprising a concise and plain statement of a problem without blaming a user, and outputting a recording of the brief negative prompt at a lower volume.

28. The apparatus as recited in claim 1 wherein the logic that provides the personality comprises selecting a prompt based on a user's experience with using the voice user interface during a current session and across sessions.

29. The apparatus as recited in claim 28 wherein the logic that provides the personality comprises selecting a shorter prompt based on the user's experience with using the voice user interface during the current session and across sessions.

30. The apparatus as recited in claim 28 wherein the logic that provides the personality comprises selecting a longer help prompt if the user's input indicates a problem with increasing frequency during the current session and across sessions.

31. The apparatus as recited in claim 28 wherein the logic that provides the personality comprises selecting a prompt that provides the available options to the user if the voice user interface does not recognize a command spoken by the user or if the user has not spoken for a defined period of time.

32. The apparatus as recited in claim 28 wherein the logic that provides the personality comprises selecting a coaching prompt that provides a current state of interaction, provides commands that the user can say at the current state of interaction, and provides the actions that would be taken in response to each of the commands.

33. The apparatus as recited in claim 1 wherein the logic that provides the personality comprises selecting an approximation prompt.

34. The apparatus as recited in claim 1 wherein the logic that provides the personality comprises providing the voice user interface with a first personality and a second personality.

35. The apparatus as recited in claim 34 wherein the first voice signals comprise the voice of the first personality, and second voice signals comprise the voice of the second personality.

36. The apparatus as recited in claim 34 wherein a first virtual assistant comprises the first personality, and a second virtual assistant comprise s the second personality.

37. The apparatus as recited in claim 36 wherein the first virtual assistant and the second virtual assistant comprise different genders.

38. The apparatus as recited in claim 36 wherein a user selects the first virtual assistant or the second virtual assistant based on descriptions of the first virtual assistant and the second virtual assistant or based on interacting with the first virtual assistant and the second virtual assistant.

39. The apparatus as recited in claim 1 wherein the logic that provides the personality comprises selecting a humorous prompt.

40. The apparatus as recited in claim 1 wherein the voice user interface with personality comprises a virtual assistant for a voice-based desktop environment.

41. The apparatus as recited in claim 40 wherein the desktop environment comprises multiple objects, the virtual assistant being navigated among the multiple objects by a user.

42. The apparatus as recited in claim 1 wherein the logic that provides the voice user interface comprises:
    echo cancellation software, barge-in software, signal processing software, automatic speech recognition/natural language software, request for services software, and text-to-speech/recorded speech software.

43. A method for a voice user interface with personality, the method comprising:
    storing a recognition grammar in a memory, the recognition grammar comprising multiple phrases that a virtual assistant with a personality can recognize when spoken by a user, the recognition grammar being selected based on the personality of the virtual assistant;
    executing a voice user interface, the voice user interface outputting first voice signals, the voice user interface recognizing speech signals; and
    controlling the voice user interface to provide the voice user interface with a verbal personality.

44. The method as recited in claim 43 wherein the voice user interface with personality comprises computer software stored in the memory of a computer system, the computer software being executed on a processor of the computer system.

45. The method as recited in claim 43 wherein the voice user interface with personality comprises a virtual assistant with personality.

46. The method as recited in claim 45 wherein the personality of the virtual assistant comprises a predetermined tone or cadence, a predetermined vocabulary, a predetermined sentence construction, or a predetermined degree of assertiveness.

47. The method as recited in claim 43 wherein the first voice signals comprise a prompt, the prompt being scripted for the personality of the voice user interface.

48. The method as recited in claim 43 wherein the first voice signals comprise a recorded prompt, the recorded prompt being acted and recorded for the personality of the voice user interface.

49. The method as recited in claim 43 wherein the controlling the voice user interface comprises randomly selecting a specific prompt that corresponds to a generic prompt.

50. The method as recited in claim 43 wherein the controlling the voice user interface comprises selecting a prompt, the prompt comprising an appropriate temporal prompt.

51. The method as recited in claim 43 wherein the controlling the voice user interface comprises selecting a prompt to respond to a user, the prompt comprising a term that was previously spoken by the user in a recognized command.

52. The method as recited in claim 43 wherein the voice user interface comprises recognizing multiple spoken commands as a predetermined command.

53. The method as recited in claim 43 wherein the voice user interface comprises generating second voice signals, the second voice signals comprising synthesized voice signals that correspond to text.

54. The method as recited in claim 43 wherein the controlling the voice user interface comprises selecting a smooth hand-off prompt that provides a smooth hand-off between the first voice signals and second voice signals, the second voice signals being output by the voice user interface.

55. The method as recited in claim 54 wherein the controlling the voice user interface comprises selecting a first complete sentence for output by the first voice signals and a second complete sentence for output by the second voice signals.

56. The method as recited in claim 55 wherein the first voice signals comprise the voice of a virtual assistant and the second voice signals comprise the voice of a helper to the virtual assistant.

57. The method as recited in claim 56 wherein the second voice signals comprise recorded voice signals.

58. The method as recited in claim 56 wherein the second voice signals comprise synthesized voice signals.

59. The method as recited in claim 43 wherein the controlling the voice user interface comprises controlling the selection of the first voice signals output by the voice user interface such that the voice user interface behaves consistently with social and emotional norms, including politeness, while interacting with the user.

60. The method as recited in claim 59 wherein the controlling the voice user interface comprises selecting a word that is within the recognition grammar to be output by the first voice signals.

61. The method as recited in claim 59 wherein the controlling the voice user interface comprises controlling the selection of the first voice signals output by the voice user interface such that the voice user interface addresses a user by a proper name of the user.

62. The method as recited in claim 59 wherein the speech signals comprise user commands spoken politely.

63. The method as recited in claim 43 wherein the controlling the voice user interface comprises controlling the voice user interface in situations in which negative comments are needed.

64. The method as recited in claim 63 wherein the controlling the voice user interface comprises selecting a negative prompt, and outputting a recording of the negative prompt at a lower volume.

65. The method as recited in claim 43 wherein the controlling the voice user interface comprises selecting a prompt based on a user's experience with using the voice user interface during a current session and across sessions.

66. The method as recited in claim 65 wherein the controlling the voice user interface comprises selecting a shorter prompt based on the user's experience with using the voice user interface during the current session and across sessions.

67. The method as recited in claim 65 wherein the controlling the voice user interface comprises selecting a longer help prompt if the user's input indicates a problem with increasing frequency during the current session and across sessions.

68. The method as recited in claim 65 wherein the controlling the voice user interface comprises selecting a prompt that lists the available options to the user if the voice user interface does not recognize a command spoken by the user or if the user has not spoken for a defined period of time.

69. The method as recited in claim 65 wherein the controlling the voice user interface comprises selecting a coaching prompt that provides a current state of interaction, lists commands that the user can say at the current state of interaction, and lists the actions that would be taken in response to each of the commands.

70. The method as recited in claim 43 wherein the controlling the voice user interface comprises selecting an approximation prompt.

71. The method as recited in claim 43 wherein the controlling the voice user interface comprises providing the voice user interface with a first personality and a second personality.

72. The method as recited in claim 71 wherein the first voice signals comprise the voice of the first personality, and second voice signals comprise the voice of the second personality.

73. The method as recited in claim 71 wherein a first virtual assistant comprises the first personality, and a second virtual assistant comprises the second personality.

74. The method as recited in claim 73 wherein the first virtual assistant and the second virtual assistant comprise different genders.

75. The method as recited in claim 73 wherein a user selects the first virtual assistant or the second virtual assistant based on descriptions of the first virtual assistant and the second virtual assistant or based on interacting with the first virtual assistant and the second virtual assistant.

76. The method as recited in claim 43 wherein the voice user interface with personality comprises selecting a humorous prompt.

77. The method as recited in claim 43 wherein the voice user interface with personality comprises a virtual assistant for a voice-based desktop environment.

78. The method as recited in claim 77 wherein the desktop environment comprises multiple objects, the virtual assistant being navigated among the multiple objects by a user.

79. The method as recited in claim 43 wherein the voice user interface comprises:

echo cancellation software, barge-in software, signal processing software, automatic speech recognition/natural language software, request for services software, and text-to-speech/recorded speech software.

80. A data signal in a carrier wave for a voice user interface with personality, the data signal in a carrier wave comprising:

first voice signals, the first voice signals being output by a voice user interface with a verbal personality; and speech signals, the voice user interface with a verbal personality recognizing the speech signals using a recognition grammar, the recognition grammar being stored in a memory and comprising multiple phrases that a virtual assistant with a personality can recognize when spoken by a user, the recognition grammar being selected based on the personality of the virtual assistant.

81. The data signal in a carrier wave as recited in claim 80 wherein the first voice signals comprise a prompt, the prompt being scripted for the personality of the voice user interface.

82. The data signal in a carrier wave as recited in claim 80 wherein the first voice signals comprise a recorded prompt, the recorded prompt being acted and recorded for the personality of the voice user interface.

83. The data signal in a carrier wave as recited in claim 80 wherein the first voice signals comprise a prompt randomly selected from multiple prompts available to provide a predetermined response.

84. The data signal in a carrier wave as recited in claim 80 wherein the first voice signals comprise a prompt, the prompt comprising an appropriate temporal prompt.

85. The data signal in a carrier wave as recited in claim 80 wherein the first voice signals comprise a prompt to respond to a user, the prompt comprising a term that was previously spoken by the user in a recognized command.

86. The data signal in a carrier wave as recited in claim 80 wherein the speech signals comprise a phrase, the phrase being recognized by the voice user interface with personality as a predetermined command.

87. The data signal in a carrier wave as recited in claim 80 further comprising:
second voice signals, the second voice signals being output by the voice user interface with personality.

88. The data signal in a carrier wave as recited in claim 87 further comprising:
third voice signals, the third voice signals being output by the voice user interface with personality, the third voice signals comprising a smooth hand-off between the first voice signals and the second voice signals.

89. The data signal in a carrier wave as recited in claim 87 wherein the first voice signals comprise a first complete sentence and the second voice signals comprise a second complete sentence.

90. The data signal in a carrier wave as recited in claim 87 wherein the first voice signals comprise the voice of the virtual assistant, and the second voice signals comprise the voice of a helper to the virtual assistant.

91. The data signal in a carrier wave as recited in claim 87 wherein the second voice signals comprise synthesized voice signals.

92. The data signal in a carrier wave as recited in claim 80 wherein the first voice signals comprise a word that is within the recognition grammar of the voice user interface with personality.

93. The data signal in a carrier wave as recited in claim 80 wherein the first voice signals comprise a proper name of the user.

94. The data signal in a carrier wave as recited in claim 80 wherein the first voice signals comprise a negative prompt, the negative prompt comprising a concise and plain statement of a problem without blaming a user, and the first voice signals being output at a lower volume.

95. The data signal in a carrier wave as recited in claim 80 wherein the first voice signals comprise a prompt that is selected based on a user's experience with using the voice user interface with personality during a current session and across sessions.

96. The data signal in a carrier wave as recited in claim 95 wherein the first voice signals comprise a longer help prompt if the user's input indicates a problem with increasing frequency during the current session and across sessions.

97. The data signal in a carrier wave as recited in claim 80 wherein the first voice signals comprise a coaching prompt that provides a current state of interaction, lists commands that the user can say at the current state of interaction, and lists the actions that would be taken in response to each of the commands.

98. The data signal in a carrier wave as recited in claim 80 wherein the first voice signals comprise an approximation prompt.

99. The data signal in a carrier wave as recited in claim 80 wherein the voice user interface with personality comprises a first personality and a second personality.

100. The data signal in a carrier wave as recited in claim 99 wherein the first voice signals comprise the voice of the first personality, and second voice signals comprise the voice of the second personality, the second voice signals being output by the voice user interface with personality.

101. The data signal in a carrier wave as recited in claim 99 wherein a first virtual assistant comprises the first personality, and a second virtual assistant comprises the second personality.

102. The data signal in a carrier wave as recited in claim 80 wherein the first voice signals comprise a humorous prompt.

* * * * *

UNITED STATES PATENT AND TRADEMARK OFFICE
CERTIFICATE OF CORRECTION

PATENT NO. : 6,144,938      Page 1 of 1
DATED : November 7, 2000
INVENTOR(S) : Albert, Roy D.; Campbell, Mark D.; Giangola, James P.; Nass, Clifford I.; Reeves, It is certified that error appears in the above-identified patent and that said Letters Patent is hereby corrected as shown below:

Please correct the cover page of the above-identified U.S. Letters Patent in

Section 73 to read:
[73]    Assignee:     General Magic, Inc., Sunnyvale, CA Signed and Sealed this Twenty-sixth Day of June, 2001

*Attest:*

NICHOLAS P. GODICI
*Attesting Officer*     *Acting Director of the United States Patent and Trademark Office*